United States Patent
Qian et al.

(10) Patent No.: US 10,291,767 B2
(45) Date of Patent: May 14, 2019

(54) INFORMATION PRESENTATION METHOD AND DEVICE

(71) Applicant: Huawei Technologies Co., Ltd., Shenzhen (CN)

(72) Inventors: Li Qian, Shenzhen (CN); Jie Zhang, Shenzhen (CN); Kangmin Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 15/330,850

(22) Filed: Nov. 7, 2016

(65) Prior Publication Data

US 2017/0064070 A1     Mar. 2, 2017

Related U.S. Application Data

(63) Continuation of application No. PCT/CN2014/088709, filed on Oct. 16, 2014.

(30) Foreign Application Priority Data

May 7, 2014    (CN) .......................... 2014 1 0191534

(51) Int. Cl.
    *H04M 1/725*     (2006.01)
    *G06K 9/00*     (2006.01)
    *G06F 17/30*     (2006.01)

(52) U.S. Cl.
    CPC .. *H04M 1/72569* (2013.01); *G06F 17/30867* (2013.01); *G06K 9/00684* (2013.01);
(Continued)

(58) Field of Classification Search
    CPC .......... G06Q 30/0255; G06Q 30/0267; G06Q 30/0269; G06Q 30/0251; G06Q 30/0271;
(Continued)

(56) References Cited

U.S. PATENT DOCUMENTS 9,282,578 B2 *   3/2016   Nishida .................... H04W 8/30
9,852,452 B2 *   12/2017   Lin ..................... G06Q 30/0269
(Continued)

FOREIGN PATENT DOCUMENTS

CN     103106259 A     5/2013
CN     103186677 A     7/2013
(Continued)

*Primary Examiner* — Matthew C Sams
(74) *Attorney, Agent, or Firm* — Leydig, Voit & Mayer, Ltd.

(57) ABSTRACT

Embodiments of the present invention provide an information presentation method and device. The method includes: receiving, by a mobile terminal, first information provided by a communications network; determining, by the mobile terminal, a presentation priority of the first information in a current situation of a user; and sending the first information to a wearable device when the presentation priority of the first information in the current situation is greater than or equal to a second preset value, so that the wearable device presents the first information to the user. According to the information presentation method and device provided by the embodiments of the present invention, information can be presented according to a scene of a user, so that a presentation effect is improved, and interference of information unrelated to a current situation with the user is reduced.

18 Claims, 7 Drawing Sheets

(52) U.S. Cl.
CPC ..... *H04M 1/7253* (2013.01); *H04M 1/72547* (2013.01); *H04M 1/72552* (2013.01)

(58) Field of Classification Search
CPC ................. G06F 1/163; G06F 17/3053; G06F 17/30867; H04L 51/24; H04L 51/26; H04L 51/02; G06N 5/04; G06N 5/048; G06N 99/005; H04M 1/72519; H04M 2250/60; H04W 4/02
See application file for complete search history.

(56) References Cited

U.S. PATENT DOCUMENTS

| | | | | |
|---|---|---|---|---|
| 2001/0040590 | A1* | 11/2001 | Abbott | G06F 1/163 715/700 |
| 2002/0054117 | A1* | 5/2002 | van Dantzich | G06F 3/0482 715/766 |
| 2007/0197195 | A1* | 8/2007 | Sugiyama | G06Q 10/107 455/412.2 |
| 2010/0094710 | A1* | 4/2010 | Ramakrishna | G06Q 30/02 705/14.64 |
| 2012/0166452 | A1* | 6/2012 | Tseng | G06F 17/30867 707/749 |
| 2013/0084805 | A1* | 4/2013 | Pasquero | G01C 17/32 455/41.2 |
| 2013/0124315 | A1* | 5/2013 | Doughty | G06Q 30/0269 705/14.53 |
| 2013/0173513 | A1* | 7/2013 | Chu | G06F 9/4443 706/14 |
| 2013/0218974 | A1* | 8/2013 | Cao | H04W 4/08 709/204 |
| 2014/0052681 | A1* | 2/2014 | Nitz | H04L 51/02 706/46 |
| 2014/0118272 | A1* | 5/2014 | Gunn | G06F 3/0488 345/173 |
| 2014/0136323 | A1* | 5/2014 | Zhang | G06F 17/30483 705/14.53 |
| 2014/0180817 | A1* | 6/2014 | Zilkha | G06Q 30/02 705/14.55 |
| 2014/0213296 | A1* | 7/2014 | van Schouwen | G08G 1/005 455/456.3 |
| 2014/0289259 | A1* | 9/2014 | Tamma | G06F 17/30699 707/748 |
| 2015/0105029 | A1* | 4/2015 | Russell | H04W 4/008 455/67.11 |
| 2015/0186944 | A1* | 7/2015 | Forsblom | G06Q 30/0267 705/14.64 |
| 2015/0205465 | A1* | 7/2015 | Robison | G06F 3/0484 715/744 |
| 2015/0244665 | A1* | 8/2015 | Choi | H04L 12/58 709/206 |
| 2015/0277572 | A1* | 10/2015 | Verplaetse | G06F 3/017 345/156 |
| 2015/0286391 | A1* | 10/2015 | Jacobs | G06F 1/163 715/771 |
| 2015/0312277 | A1* | 10/2015 | Rane | G06F 21/6218 726/1 |
| 2015/0317648 | A1* | 11/2015 | Albert | G06F 17/30867 705/7.29 |
| 2016/0062116 | A1* | 3/2016 | Ham | G02B 27/017 345/156 |
| 2016/0065630 | A1* | 3/2016 | Gupta | G06F 17/30876 709/204 |

FOREIGN PATENT DOCUMENTS

| | | |
|---|---|---|
| CN | 103248658 A | 8/2013 |
| CN | 103259825 A | 8/2013 |
| CN | 103415039 A | 11/2013 |
| CN | 103577544 A | 2/2014 |
| CN | 103731253 A | 4/2014 |
| CN | 103970861 A | 8/2014 |

* cited by examiner

|  | Feature | | | | Score for information |
|---|---|---|---|---|---|
| At work | 0 1 0 ··· | 0 1 0 ··· | 0 1 0 ··· | 0 0.3 0.1 0 0.03 0.62 ··· | 5 |
| At home | 0 0 1 ··· | 1 0 0 ··· | 1 0 0 ··· | 0.2 0.15 0 0.04 0 0 ··· | 0 |
| On holiday | 1 0 0 ··· | 0 0 0 ··· | 0 0 0 ··· | 0 0.2 0 0 0.17 0 ··· | 3 |
| ⋮ | | | | | ⋮ |
| Sports | 1 0 0 ··· | 0 1 0 ··· | 0 1 0 ··· | 0 0.3 0.1 0 0.03 0.62 ··· | 1 |
| Parenting | 0 0 1 ··· | 0 0 0 ··· | 0 0 0 ··· | 0 0.2 0 0 0.17 0 ··· | 4 |
| Job-hopping | 0 0 0 ··· | 0 1 0 ··· | 0 1 0 ··· | 0.7 0.19 0 0.38 0 7 ··· | 0 |
| Feature sequence number: | A B C ··· Scene feature | E F G ··· Category feature | H I J ··· Keyword | T1 T2 T3 T4 T5 T6 ··· Content feature | |

INFORMATION PRESENTATION METHOD AND DEVICE

CROSS-REFERENCE TO RELATED APPLICATIONS

This application is a continuation of International Application No. PCT/CN2014/088709, filed on Oct. 16, 2014, which claims priority to Chinese Patent Application No. 201410191534.7, filed on May 7, 2014. The disclosures of the aforementioned applications are hereby incorporated by reference in their entireties.

TECHNICAL FIELD

Embodiments of the present invention relate to communications technologies, and in particular, to an information presentation method and device.

BACKGROUND

With the development of communications technologies and portable electronic devices, users are increasingly dependent on use of mobile terminals and wearable devices. However, a mobile terminal or a wearable device receives too much information; among the large amount of information, except junk information, some content is needed by a user, but the user does not want to read the content at a current moment in a current environment, for example, when the user is currently on holiday, the user does not want to receive work-related information; or when the user is currently in the course of a meeting, the user does not want to receive entertainment information at this time. Especially for a wearable device such as a smart watch, a user prefers that the smart watch stays silent at most of the time and pushes information only when there is a really urgent matter that needs attention of the user, rather than being preoccupied with all kinds of seamless information and notifications at any time.

However, in the prior art, a mobile terminal or a wearable device generally presents all received information to a user without filtering, and consequently, the information causes interference to the user, and has a poor presentation effect.

SUMMARY

Embodiments of the present invention provide an information presentation method and device, to solve problems in the prior art that information has a poor presentation effect and causes strong interference to a user.

According to a first aspect, an embodiment of the present invention provides an information presentation method, including:

receiving, by a mobile terminal, first information provided by a communications network, where the first information includes any one of the following: text information, image information, audio information, and video information;

determining, by the mobile terminal, a presentation priority of the first information in a current situation of a user; and sending the first information to a wearable device when the presentation priority of the first information in the current situation is greater than or equal to a second preset value, so that the wearable device presents the first information to the user.

In a first possible implementation manner of the first aspect, the determining, by the mobile terminal, a presentation priority of the first information in a current situation includes:

acquiring, by the mobile terminal, scene context information of the wearable device from the wearable device, where the scene context information is used to determine the current situation of the user;

calculating, by the mobile terminal according to the scene context information, a preset scene matching the current situation, and calculating a correlation between the first information and the preset scene; and determining, by the mobile terminal, the presentation priority of the first information in the current situation according to the correlation.

According to the first aspect or the first possible implementation manner of the first aspect, in a second possible implementation manner, after the calculating, by the mobile terminal, a presentation priority of the first information in a current situation, the method further includes:

when the presentation priority of the first information in the current situation is less than the second preset value, acquiring scene context information of the wearable device from the wearable device again after waiting for a preset period of time, where the scene context information is used to determine a current situation of the user;

calculating, by the mobile terminal according to the scene context information, a preset scene matching the current situation, and calculating a correlation between the first information and the preset scene; and determining, by the mobile terminal, a presentation priority of the first information in the current situation according to the correlation.

According to the first aspect, or the first or second possible implementation manner of the first aspect, in a third possible implementation manner, before the determining, by the mobile terminal, a presentation priority of the first information in a current situation, the method further includes:

establishing, by the mobile terminal, a scene model, where the scene model is used to determine the correlation between the first information and the preset scene, and the scene model includes at least the following three types of features: basic scene feature, information category feature, and keyword feature.

According to the third possible implementation manner of the first aspect, in a fourth possible implementation manner, the determining, by the mobile terminal, a correlation between the first information and the preset scene includes:

parsing, by the mobile terminal, a feature of the first information, and calculating the correlation between the first information and the preset scene according to the scene model.

According to the third or fourth possible implementation manner of the first aspect, in a fifth possible implementation manner, the establishing, by the mobile terminal, a scene model includes:

establishing, by the mobile terminal, the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

According to any one of the third to fifth possible implementation manners of the first aspect, in a sixth possible implementation manner, after the sending the first information to a wearable device when the presentation priority of the first information in the current situation is greater than a second preset value, so that the wearable device presents the first information to the user, the method further includes:

receiving, by the mobile terminal, the reading action information sent by the wearable device, and updating the scene model according to the reading action information.

According to a second aspect, an embodiment of the present invention provides an information presentation method, including:

receiving, by a mobile terminal, first information provided by a communications network, where the first information includes any one of the following: text information, image information, audio information, and video information;

determining, by the mobile terminal, a correlation between the first information and at least one preset scene;

determining, by the mobile terminal, a presentation priority of the first information in a current situation of a user when the correlation between the first information and at least one of the preset scenes is greater than or equal to a first preset value; and sending the first information to a wearable device when the presentation priority of the first information in the current situation is greater than or equal to a second preset value, so that the wearable device presents the first information to the user.

In a first possible implementation manner of the second aspect, after the determining, by the mobile terminal, a correlation between the first information and at least one preset scene, the method further includes:

using, by the mobile terminal, the first information as junk information when the correlation between the first information and each preset scene is less than the first preset value.

According to the second aspect or the first possible implementation manner of the second aspect, in a second possible implementation manner, the determining, by the mobile terminal, a presentation priority of the first information in a current situation includes:

acquiring, by the mobile terminal, scene context information of the wearable device from the wearable device, where the scene context information is used to determine the current situation of the user;

calculating, by the mobile terminal, a similarity between the current situation and each preset scene according to the scene context information; and calculating, by the mobile terminal, the presentation priority of the first information according to the similarity and the correlation between the first information and the preset scene.

According to the second aspect, or the first or second possible implementation manner of the second aspect, in a third possible implementation manner, after the calculating, by the mobile terminal, a presentation priority of the first information in a current situation, the method further includes:

when the presentation priority of the first information in the current situation is less than the second preset value, acquiring scene context information of the wearable device from the wearable device again after waiting for a preset period of time, where the scene context information is used to determine a current situation of the user;

calculating, by the mobile terminal according to the scene context information, a preset scene matching the current situation, and calculating a correlation between the first information and the preset scene; and determining, by the mobile terminal, a presentation priority of the first information in the current situation according to the correlation.

According to the second aspect, or any one of the first to third possible implementation manners of the second aspect, in a fourth possible implementation manner, before the determining, by the mobile terminal, a correlation between the first information and at least one preset scene, the method further includes:

establishing, by the mobile terminal, a scene model, where the scene model is used to determine the correlation between the first information and the preset scene, and the scene model includes at least the following three types of features: basic scene feature, information category feature, and keyword feature.

According to the fourth possible implementation manner of the second aspect, in a fifth possible implementation manner, the determining, by the mobile terminal, a correlation between the first information and at least one preset scene includes:

parsing, by the mobile terminal, a feature of the first information, and calculating the correlation between the first information and the at least one preset scene according to the scene model.

According to the fourth or fifth possible implementation manner of the second aspect, in a sixth possible implementation manner, the establishing, by the mobile terminal, a scene model includes:

establishing, by the mobile terminal, the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

According to any one of the fourth to sixth possible implementation manners of the second aspect, in a seventh possible implementation manner, after the sending the first information to a wearable device when the presentation priority of the first information in the current situation is greater than a second preset value, so that the wearable device presents the first information to the user, the method further includes:

receiving, by the mobile terminal, the reading action information sent by the wearable device, and updating the scene model according to the reading action information.

According to a third aspect, an embodiment of the present invention provides an information presentation method, including:

receiving, by a wearable device, first information, where the first information is sent by a mobile terminal after the mobile terminal determines that a presentation priority in a current situation is greater than a second preset value, and the first information includes any one of the following: text information, image information, audio information, and video information; and presenting, by the wearable device, the first information to a user.

In a first possible implementation manner of the third aspect, after the presenting, by the wearable device, the first information to a user, the method further includes:

capturing, by the wearable device, reading action information, where the reading action information at least includes: whether the first information is deleted, whether the first information is read, duration of reading the first information, and whether the first information is forwarded; and sending, by the wearable device, the reading action information to the mobile terminal, so that the mobile terminal updates the scene model according to the reading action information.

According to the third aspect or the first possible implementation manner of the third aspect, in a second possible implementation manner, the method further includes:

receiving, by the wearable device, a scene context information request sent by the mobile terminal; and sending, by the wearable device, scene context information to the mobile terminal.

According to the third aspect, or the first or second possible implementation manner of the third aspect, in a third possible implementation manner, the presenting, by the wearable device, the first information to a user includes:

sending out, by the wearable device, prompt information.

According to a fourth aspect, an embodiment of the present invention provides an information presentation method, including:

receiving, by an intelligent device, first information provided by a communications network, where the first information includes any one of the following: text information, image information, audio information, and video information;

determining, by the intelligent device, a correlation between the first information and at least one preset scene;

determining, by the intelligent device, a presentation priority of the first information in a current situation when the correlation between the first information and at least one of the preset scenes is greater than or equal to a first preset value; and presenting, by the intelligent device, the first information to a user when the presentation priority of the first information in the current situation is greater than or equal to a second preset value.

In a first possible implementation manner of the fourth aspect, after the determining, by the intelligent device, a correlation between the first information and at least one preset scene, the method further includes:

using, by the intelligent device, the first information as junk information when the correlation between the first information and each preset scene is less than the first preset value.

According to the fourth aspect or the first possible implementation manner of the fourth aspect, in a second possible implementation manner, the determining, by the intelligent device, a presentation priority of the first information in a current situation includes:

acquiring, by the intelligent device, scene context information, where the scene context information is used to determine the current situation of the user;

calculating, by the intelligent device, a similarity between the current situation and each preset scene according to the scene context information; and calculating, by the intelligent device, the presentation priority of the first information according to the similarity and the correlation between the first information and the preset scene.

According to the fourth aspect, or the first or second possible implementation manner of the fourth aspect, in a third possible implementation manner, after the determining, by the intelligent device, a presentation priority of the first information in a current situation, the method further includes:

when the presentation priority of the first information in the current situation is less than the second preset value, acquiring scene context information again after waiting for a preset period of time;

calculating, by the intelligent device, a similarity between a current situation and each preset scene according to the scene context information; and calculating, by the intelligent device, a presentation priority of the first information according to the similarity and a correlation between the first information and a preset scene.

According to the fourth aspect, or any one of the first to third possible implementation manners of the fourth aspect, in a fourth possible implementation manner, before the determining, by the intelligent device, a correlation between the first information and at least one preset scene, the method further includes:

establishing, by the intelligent device, a scene model, where the scene model is used to determine the correlation between the first information and the preset scene, and the scene model includes at least the following three types of features: basic scene feature, information category feature, and keyword feature.

According to the fourth possible implementation manner of the fourth aspect, in a fifth possible implementation manner, the determining, by the intelligent device, a correlation between the first information and at least one preset scene includes:

parsing, by the intelligent device, a feature of the first information, and calculating the correlation between the first information and the at least one preset scene according to the scene model.

According to the fourth or fifth possible implementation manner of the fourth aspect, in a sixth possible implementation manner, the establishing, by the intelligent device, a scene model includes:

establishing, by the intelligent device, the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

According to any one of the fourth to sixth possible implementation manners of the fourth aspect, in a seventh possible implementation manner, after the presenting the first information to a user when the presentation priority of the first information in the current situation is greater than a second preset value, the method further includes:

capturing, by the intelligent device, the reading action information of the user, and updating the scene model according to the reading action information.

According to the fourth aspect, or any one of the first to seventh possible implementation manners of the fourth aspect, in an eighth possible implementation manner, the presenting, by the intelligent device, the first information to a user includes:

sending out, by the intelligent device, prompt information.

According to a fifth aspect, an embodiment of the present invention provides an information presentation method, including:

receiving, by an intelligent device, first information provided by a communications network, where the first information includes any one of the following: text information, image information, audio information, and video information;

determining, by the intelligent device, a presentation priority of the first information in a current situation; and presenting, by the intelligent device, the first information to a user when the presentation priority of the first information in the current situation is greater than or equal to a second preset value.

In a first possible implementation manner of the fifth aspect, the determining, by the intelligent device, a presentation priority of the first information in a current situation includes:

acquiring, by the intelligent device, scene context information, where the scene context information is used to determine the current situation of the user;

calculating, by the intelligent device according to the scene context information, a preset scene matching the current situation, and calculating a correlation between the first information and the preset scene; and determining, by the intelligent device, the presentation priority of the first information in the current situation according to the correlation.

According to the fifth aspect or the first possible implementation manner of the fifth aspect, in a second possible implementation manner, after the determining, by the intelligent device, a presentation priority of the first information in a current situation, the method further includes:

when the presentation priority of the first information in the current situation is less than the second preset value, acquiring scene context information again after waiting for a preset period of time;

calculating, by the intelligent device, a similarity between the current situation and each preset scene according to the scene context information; and calculating, by the intelligent device, a presentation priority of the first information according to the similarity and a correlation between the first information and a preset scene.

According to a sixth aspect, an embodiment of the present invention provides an information filtering apparatus, including:

a receiving module, configured to receive first information provided by a communications network, where the first information includes any one of the following: text information, image information, audio information, and video information;

a processing module, configured to determine a presentation priority of the first information in a current situation of a user; and a sending module, configured to send the first information to a wearable device when the presentation priority of the first information in the current situation is greater than or equal to a second preset value, so that the wearable device presents the first information to the user.

In a first possible implementation manner of the sixth aspect, the processing module is specifically configured to:

acquire scene context information of the wearable device from the wearable device, where the scene context information is used to determine the current situation of the user; and calculate, according to the scene context information, a preset scene matching the current situation, and calculate a correlation between the first information and the preset scene; and determine the presentation priority of the first information in the current situation according to the correlation.

According to the sixth aspect or the first possible implementation manner of the sixth aspect, in a second possible implementation manner, the processing module is further configured to:

when the presentation priority of the first information in the current situation is less than the second preset value, acquire scene context information of the wearable device from the wearable device again after waiting for a preset period of time, where the scene context information is used to determine a current situation of the user;

calculate, according to the scene context information, a preset scene matching the current situation, and calculate a correlation between the first information and the preset scene; and determine a presentation priority of the first information in the current situation according to the correlation.

According to the sixth aspect, or the first or second possible implementation manner of the sixth aspect, in a third possible implementation manner, the processing module is further configured to:

establish a scene model, where the scene model is used to determine the correlation between the first information and the preset scene, and the scene model includes at least the following three types of features: basic scene feature, information category feature, and keyword feature.

According to the third possible implementation manner of the sixth aspect, in a fourth possible implementation manner, the processing module is specifically configured to:

parse a feature of the first information, and calculate the correlation between the first information and the preset scene according to the scene model.

According to the third or fourth possible implementation manner of the sixth aspect, in a fifth possible implementation manner, the processing module is specifically configured to:

establish the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

According to any one of the third to fifth possible implementation manners of the sixth aspect, in a sixth possible implementation manner, the receiving module is further configured to:

after the first information is sent to the wearable device when the presentation priority of the first information in the current situation is greater than the second preset value, to enable the wearable device to present the first information to the user, receive the reading action information sent by the wearable device, and update the scene model according to the reading action information.

According to a seventh aspect, an embodiment of the present invention provides an information filtering apparatus, including:

a receiving module, configured to receive first information provided by a communications network, where the first information includes any one of the following: text information, image information, audio information, and video information;

a processing module, configured to determine a correlation between the first information and at least one preset scene; and determine a presentation priority of the first information in a current situation of a user when the correlation between the first information and at least one of the preset scenes is greater than or equal to a first preset value; and a sending module, configured to send the first information to a wearable device when the presentation priority of the first information in the current situation is greater than or equal to a second preset value, so that the wearable device presents the first information to the user.

In a first possible implementation manner of the seventh aspect, the processing module is further configured to:

after determining the correlation between the first information and the at least one preset scene, use the first information as junk information when the correlation between the first information and each preset scene is less than the first preset value.

According to the seventh aspect or the first possible implementation manner of the seventh aspect, in a second possible implementation manner, the processing module is specifically configured to:

acquire scene context information of the wearable device from the wearable device, where the scene context information is used to determine the current situation of the user; and calculate a similarity between the current situation and each preset scene according to the scene context information; and calculate the presentation priority of the first information according to the similarity and the correlation between the first information and the preset scene.

According to the seventh aspect, or the first or second possible implementation manner of the seventh aspect, in a third possible implementation manner, the processing module is further configured to:

after determining the presentation priority of the first information in the current situation, when the presentation priority of the first information in the current situation is less than the second preset value, acquire scene context information of the wearable device from the wearable device again after waiting for a preset period of time, where the scene context information is used to determine a current situation of the user;

calculate, according to the scene context information, a preset scene matching the current situation, and calculate a correlation between the first information and the preset scene; and determine a presentation priority of the first information in the current situation according to the correlation.

According to the seventh aspect, or any one of the first to third possible implementation manners of the seventh aspect, in a fourth possible implementation manner, the processing module is further configured to:

establish a scene model before determining the correlation between the first information and the at least one preset scene, where the scene model is used to determine the correlation between the first information and the preset scene, and the scene model includes at least the following three types of features: basic scene feature, information category feature, and keyword feature.

According to the fourth possible implementation manner of the seventh aspect, in a fifth possible implementation manner, the processing module is specifically configured to:

parse a feature of the first information, and calculate the correlation between the first information and the at least one preset scene according to the scene model.

According to the fourth or fifth possible implementation manner of the seventh aspect, in a sixth possible implementation manner, the processing module is specifically configured to:

establish the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

According to any one of the fourth to sixth possible implementation manners of the seventh aspect, in a seventh possible implementation manner, the receiving module is further configured to:

after the first information is sent to the wearable device when the presentation priority of the first information in the current situation is greater than the second preset value, to enable the wearable device to present the first information to the user, receive the reading action information sent by the wearable device, and update the scene model according to the reading action information.

According to an eighth aspect, an embodiment of the present invention provides an information presentation apparatus, including:

a receiving module, configured to receive first information, where the first information is sent by a mobile terminal after the mobile terminal determines that a presentation priority in a current situation is greater than a second preset value, and the first information includes any one of the following: text information, image information, audio information, and video information; and a presenting module, configured to present the first information to a user.

In a first possible implementation manner of the eighth aspect, the apparatus further includes:

a capturing module, configured to capture reading action information after the presenting module presents the first information to the user, where the reading action information at least includes: whether the first information is deleted, whether the first information is read, duration of reading the first information, and whether the first information is forwarded; and a sending module, configured to send the reading action information to the mobile terminal, so that the mobile terminal updates the scene model according to the reading action information.

According to the eighth aspect or the first possible implementation manner of the eighth aspect, in a second possible implementation manner;

the receiving module is further configured to receive a scene context information request sent by the mobile terminal; and the sending module is further configured to send scene context information to the mobile terminal.

According to the eighth aspect, or the first or second possible implementation manner of the eighth aspect, in a third possible implementation manner, the presenting module is specifically configured to:

send out prompt information.

According to a ninth aspect, an embodiment of the present invention provides an information presentation apparatus, including:

a receiving module, configured to receive first information provided by a communications network, where the first information includes any one of the following: text information, image information, audio information, and video information;

a processing module, configured to determine a correlation between the first information and at least one preset scene; and determine a presentation priority of the first information in a current situation when the correlation between the first information and at least one of the preset scenes is greater than or equal to a first preset value; and a presenting module, configured to present the first information to a user when the presentation priority of the first information in the current situation is greater than or equal to a second preset value.

In a first possible implementation manner of the ninth aspect, the processing module is further configured to:

after determining the correlation between the first information and the at least one preset scene, use the first information as junk information when the correlation between the first information and each preset scene is less than the first preset value.

According to the ninth aspect or the first possible implementation manner of the ninth aspect, in a second possible implementation manner, the processing module is specifically configured to:

acquire scene context information, where the scene context information is used to determine the current situation of the user;

calculate a similarity between the current situation and each preset scene according to the scene context information; and calculate the presentation priority of the first information according to the similarity and the correlation between the first information and the preset scene.

According to the ninth aspect, or the first or second possible implementation manner of the ninth aspect, in a third possible implementation manner, the processing module is specifically configured to:

after determining the presentation priority of the first information in the current situation, when the presentation priority of the first information in the current situation is less than the second preset value, acquire scene context information again after waiting for a preset period of time;

calculate a similarity between a current situation and each preset scene according to the scene context information; and calculate a presentation priority of the first information according to the similarity and a correlation between the first information and a preset scene.

According to the ninth aspect, or any one of the first to third possible implementation manners of the ninth aspect, in a fourth possible implementation manner, the processing module is further configured to:

establish a scene model before determining the correlation between the first information and the at least one preset scene, where the scene model is used to determine the correlation between the first information and the preset scene, and the scene model includes at least the following three types of features: basic scene feature, information category feature, and keyword feature.

According to the fourth possible implementation manner of the ninth aspect, in a fifth possible implementation manner, the processing module is specifically configured to:

parse a feature of the first information, and calculate the correlation between the first information and the at least one preset scene according to the scene model.

According to the fourth or fifth possible implementation manner of the ninth aspect, in a sixth possible implementation manner, the processing module is specifically configured to:

establish the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

According to any one of the fourth to sixth possible implementation manners of the ninth aspect, in a seventh possible implementation manner, the apparatus further includes:

a capturing module, configured to: when the presentation priority of the first information in the current situation is greater than the second preset value, after the first information is presented to the user, capture the reading action information of the user, and update the scene model according to the reading action information.

According to the ninth aspect, or any one of the first to seventh possible implementation manners of the ninth aspect, in an eighth possible implementation manner, the presenting module is specifically configured to:

send out prompt information.

According to a tenth aspect, an embodiment of the present invention provides an information presentation apparatus, including:

a receiving module, configured to receive first information provided by a communications network, where the first information includes any one of the following: text information, image information, audio information, and video information;

a processing module, configured to determine a presentation priority of the first information in a current situation; and a presenting module, configured to present the first information to a user when the presentation priority of the first information in the current situation is greater than or equal to a second preset value.

In a first possible implementation manner of the tenth aspect, the processing module is specifically configured to:

acquire scene context information, where the scene context information is used to determine the current situation of the user;

calculate, according to the scene context information, a preset scene matching the current situation, and calculate a correlation between the first information and the preset scene; and determine the presentation priority of the first information in the current situation according to the correlation.

According to the tenth aspect or the first possible implementation manner of the tenth aspect, in a second possible implementation manner, the processing module is specifically configured to:

after determining the presentation priority of the first information in the current situation, when the presentation priority of the first information in the current situation is less than the second preset value, acquire scene context information again after waiting for a preset period of time;

calculate a similarity between a current situation and each preset scene according to the scene context information; and calculate a presentation priority of the first information according to the similarity and a correlation between the first information and a preset scene.

According to the information presentation method and device provided by the embodiments of the present invention, after first information provided by a communications network is received, a presentation priority of the first information in a current situation of a user is determined, and the first information is presented to the user only when the presentation priority of the first information in the current situation is greater than or equal to a first preset value, that is, it can be implemented that only important and urgent information or information strongly related to the current situation of the user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

According to the information presentation method and device provided by the embodiments of the present invention, after first information provided by a communications network is received, a correlation between the first information and at least one preset scene is determined, and only when a correlation between the first information and a first preset scene is greater than a first preset value, does the mobile terminal present the first information to a user when determining that the user is in the first preset scene, that is, it can be implemented that only important and urgent information or information strongly related to a current situation of the user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
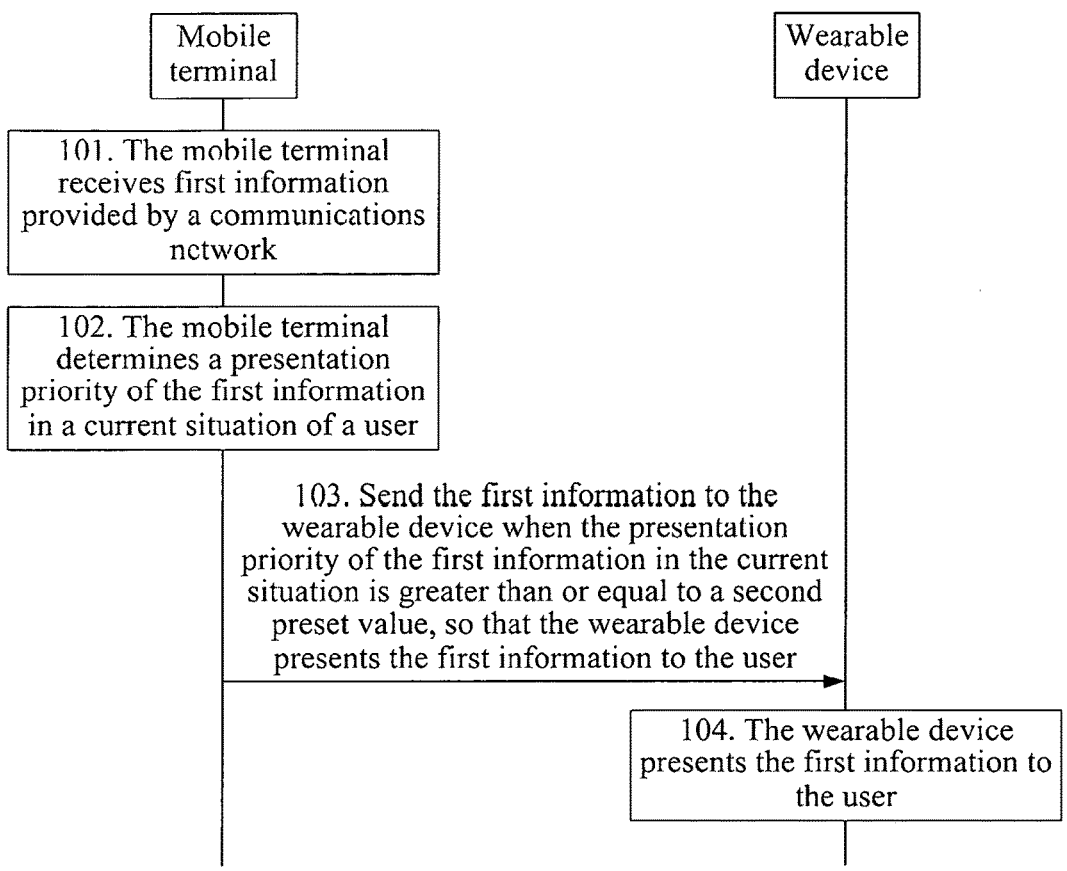
FIG. 1 is a signaling flowchart of Embodiment 1 of an information presentation method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In view of the problems that currently, a mobile terminal receives too much information, and the information has poor pushing and presentation effects, and disturbs a user, the present invention provides a method for pushing and presenting information adaptively according to a user situation, where after receiving information, a mobile terminal or an intelligent device selects, according to a current situation of a user and a corresponding user scene model, important and urgent information or information strongly related to the user for presentation. The present invention may have two implementation manners. The first implementation manner is completed by a mobile terminal and a wearable device by means of coordination, where the mobile terminal functions as an information anchor and performs scene analysis, and is responsible for forwarding and pushing information to the wearable device; the mobile terminal receives information from a network side and analyzes the information and a scene which a user is in, and the wearable device presents the information. After that, the wearable device may further capture a reading action of the user and feeds back the reading action to the mobile terminal, so that the mobile terminal analyzes the reading action and updates a user scene model. The mobile terminal may be a mobile terminal, and the wearable device may be a smart watch, smart glasses, or other devices. The second implementation manner is that an intelligent device independently completes an entire process of receiving information from a network side, analyzing the information and a scene which the user is in, and presenting the information. The intelligent device in the second case may be a mobile terminal or a wearable device. The two implementation manners are separately described below.

A communications network in each embodiment of the present invention may be a cellular network, for example, a Global System for Mobile Communications (Global System for Mobile Communications, GSM for short), a Universal Mobile Telecommunications System (Universal Mobile Telecommunications System, UMTS for short), Long Term Evolution (Long Term Evolution, LTE for short), Code Division Multiple Access (Code Division Multiple Access, CDMA for short), a wireless local area network (Wireless Local Area Networks, WLAN for short), or a near field communication network (Near Field Communication, NFC for short).

A mobile terminal in each embodiment of the present invention includes but is not limited to a mobile phone, a smartphone, a tablet computer, or another handheld device, and a wearable device in each embodiment of the present invention includes but is not limited to a smart watch or smart glasses.

FIG. 1 is a signaling flowchart of Embodiment 1 of an information presentation method according to the present invention. This embodiment is jointly completed by a mobile terminal and a wearable device. Generally, a user may have both a mobile terminal and a wearable device, where the mobile terminal has a relatively more powerful processing capability than the wearable device, and can take various task analyzing and processing responsibilities; and the wearable device has a closest relationship with the user because of its wearable feature, and may be configured to provide a prompt or present content of important and urgent information in real time. As shown in FIG. 1, the method in this embodiment may include:

Step 101: A mobile terminal receives first information provided by a communications network.

The first information may be various types of information, such as text information, image information, or audio/video information.

Step 102: The mobile terminal determines a presentation priority of the first information in a current situation of a user.

Optionally, a method for determining a presentation priority of the first information in a current situation of a user in step 102 may include:

acquiring, by the mobile terminal, scene context information of the wearable device from the wearable device, where the scene context information is used to determine the current situation of the user; calculating a similarity between the current situation and each preset scene according to the scene context information, and calculating a correlation between the first information and the preset scene; and then, calculating the presentation priority of the first information in the current situation according to the similarity and the correlation between the first information and the preset scene.

In a specific implementation, the mobile terminal may parse the received first information and extract a related feature. By using text information as an example, the extracted feature may include: a feature of an original author of the information; a social relationship between the original author of the information and the user; a content feature, for example, which words are included in content, frequency at which these words appear, whether a keyword or symbol is included, and a similarity between information that the user likes in history and the information; and a global feature, for example, how many users also like the information in a global range, and how much other information includes a link pointing to the information.

Then, the correlation between the first information and each preset scene is calculated according to a certain algorithm, or a preset scene corresponding to the first information is calculated, where a preset scene suitable for pushing the first information, that is, a highly-related (a correlation is greater than a preset value) preset scene, may be referred to as a first preset scene. The preset scene may include, for example, at work, at home, and on the road, and a content feature of information to which a user pays attention in a corresponding specific scene may be defined by using a scene model. A degree of attention that the user pays to the first information in each corresponding preset scene, that is, the correlation between the first information and each preset scene may be learned by calculating a user evaluation score for the first information in each scene model.

In a specific implementation, the mobile terminal may calculate a correlation between the first information and at least one preset scene according to a feature vector of the information and a scene model matrix, where the correlation may be a real number.

Before that, the mobile terminal may first establish a scene model, and in a preferable implementation manner, the scene model may include at least three types of features: basic scene feature, information category feature, and keyword feature, where the basic scene feature is used to represent a specific scene, the information category feature is used to represent an interest category of the user, and the keyword feature is used to represent a specific point of interest of the user.

The basic scene feature is, for example, a time, a geographical location, and light, and is used to represent a specific scene, and generally, may be a scene in the real world, for example, at work, at home, or on the road; the information category feature is, for example, entertainment, sports, or finance and economics, and is used to represent an interest category of the user; and the keyword feature is a keyword extracted from information, and is used to represent a point of interest, with a finer granularity, of the user, for example, the $18^{th}$ National Congress of the Communist Party of China, or the Olympic Games.

A specific parameter of a user scene model may be acquired by means of machine learning. The user scene model describes scores for the content feature after the content feature extracted from the information is mapped to the three dimensions: the basic scene feature, the information category feature, and the keyword feature, and in a specific application process, the user scene model is presented in a form of a matrix.

Optionally, the established scene model may be obtained according to a browsing history record. Specifically, the mobile terminal establishes the scene model according to the browsing history record, where information in the browsing history record has a same weight or different weights according to a time at which the information is browsed. For example, it may be set that: a history record that is close to a current time in time has a higher weight, and a history record that is far from the current time in time has a lower weight.

The parameter of the user scene model may be acquired by means of machine learning. In a training phase, obtained historical information is expressed in a form of a matrix, and a record in each piece of information is one row in the matrix, and includes a basic scene feature, an information category feature, a keyword feature, an information content feature, and a score given by the user for the information.

In an implementation manner, a range of values of the evaluation score given by the user for the information is set to, for example, 1 to 5, and the score may be acquired according to a reading action that is of the user and used as an implicit feedback. As an implementation manner, a mapping relationship between reading actions of the user and evaluation scores for the information may be as follows:

null: no evaluation of the user on the information is obtained;

1: the user sets the information as junk information;

2: the user does not click or read the information;

3: browsing roughly (for example, a reading time is less than 1 minute);

4: reading carefully (for example, a reading time is more than 3 minutes); and

5: reading for a long time and forwarding (for example, a reading time is more than 3 minutes and the information is forwarded).

The mobile terminal may provide each piece of information with a score of the user according to the foregoing mapping relationship, and learn accordingly to obtain user scene models corresponding to different scenes, for example, the $i^{th}$ preset scene is Si, and a scene model corresponding thereto is Ui.

In addition, the mobile terminal may further determine whether a current situation is a first preset scene suitable for pushing the first information, for example, if a presentation priority of the first information in the current situation is greater than or equal to a first preset value, the mobile terminal may determine that the current situation is suitable for pushing the first information.

Step 103: Send the first information to a wearable device when the presentation priority of the first information in the current situation is greater than or equal to a second preset value, so that the wearable device presents the first information to the user.

When the presentation priority of the first information in the current situation is less than the second preset value, step 102 is performed again after a wait of a preset period of time. A specific execution process may be: acquiring, by the mobile terminal, scene context information of the wearable device from the wearable device; calculating, by the mobile terminal according to the scene context information, a preset scene matching a current situation, and calculating a correlation between the first information and the preset scene; and determining, by the mobile terminal, a presentation priority of the first information in the current situation according to the correlation.

Specifically, the mobile terminal may acquire a parameter used to determine the basic scene feature, identify whether the current situation is the first preset scene, and send the first information to the wearable device when determining that the user is in the first preset scene.

Alternatively, the mobile terminal may also calculate, according to the basic scene feature, a correlation between the current situation of the user and a scene {Si} corresponding to each scene model {Ui}, that is, separately calculate, on each dimension, a set {wi} of similarity values between the current situation of the user and the scenes {Si} corresponding to the scene models {Ui}.

Optionally, a score set {Vi}, corresponding to the scene models {Ui}, of the first information may be further calculated according to the set {wi} of similarity values, the presentation priority of the first information is calculated, and the first information is sent to the wearable device when the presentation priority is greater than or equal to the second preset value.

Specifically, the presentation priority of the first information may be calculated by using the following formula:

$$P = w1*V1 + w2*V2 + \ldots wj*Vj$$

where Vi is a score for the information in the scene model Ui; wi is a similarity value between the current situation of the user and the scene Si corresponding to the scene model Ui; and P is the presentation priority of the first information.

Further, when the mobile terminal determines that the user is not in the first preset scene currently, or the presentation priority of the first information is less than the second preset value, the mobile terminal may perform step 102 and step 103 again after waiting for a certain period of time, to find a suitable opportunity for presenting the first information.

Step 104: The wearable device presents the first information to the user.

Specifically, the wearable device may display the first information on an interface, or may prompt the user to view the first information by sending out an alert tone or vibrating, and/or by using another notification manner.

Optionally, after that, the wearable device may further capture reading action information of the user, and send the reading action information of the user to the mobile terminal, and after receiving the reading action information, the mobile terminal may parse a content feature of the information, and update the user scene model accordingly.

A common reading action of the user that needs to be captured may be as follows: whether the user sets the information as junk information, whether the user clicks and reads the information, the user roughly or carefully browses the information, the user reads the information for a long time and forwards the information, and the like. These actions are used as implicit feedbacks and may be used to acquire a situation about a score given by the user for the information, so as to use the information as a corpus for an update, to update the user scene model. Particularly, for content to which the user pays special attention, for example, content that is read for a long time and forwarded by the user (an implicit score given by the user is 5), a keyword of the read content may be acquired, and a specific event of the content to which the user pays attention may be extracted precisely, so as to update a keyword feature of the user scene model.

Updating the user scene model is adding an obtained latest reading record of the user to a training corpus, and recalculating a user scene matrix. Specifically, model updating and learning may include the following two methods: keeping a size of a training corpus constant, continuously adding new records, and deleting earliest records; or assigning a different weight to each record according to a time sequence.

In this embodiment, after receiving first information provided by a communications network, a mobile terminal determines a presentation priority of the first information in a current situation, and sends the first information to a wearable device, so that the wearable device presents the first information to a user. That is, it is implemented that only important and urgent information or information strongly related to the current situation of the user is pushed or presented according to the current situation of the user. Therefore, interference of information unrelated to the current situation with the user can be reduced, Moreover, because the presented information is needed by the user, a possibility of carefully reading the information by the user can be increased, and a presentation effect can be improved.

In the foregoing embodiment, a possible implementation manner of determining, by the mobile terminal, a presentation priority of the first information in a current situation of a user in step 102 is: acquiring, by the mobile terminal, scene context information from the wearable device; calculating, according to the scene context information, a preset scene matching the current situation, that is, determining a preset scene to which the current situation belongs, and calculating a correlation between the first information and the preset scene; and determining the presentation priority of the first information in the current situation according to the correlation. Specifically, a mapping relationship between the correlation between the first information and the preset scene and the presentation priority of the first information in the current situation may be determined in advance, and in an embodiment, the correlation between the first information and the preset scene may be directly used as the presentation priority of the first information in the current situation.

For example, when the first information is entertainment information but the mobile terminal determines, according to the scene context information, that the current situation is a conference scene, predictably, the mobile terminal calculates to learn that the correlation between the first information and the preset scene is less than the first preset value, for example, 1 or 0, and correspondingly, the mobile terminal may determine accordingly that the presentation priority of the first information in the current situation is also very small and is less than the second preset value, that is, determine that it is unsuitable to push the first information to the user in the current situation.

It should be noted that, the mobile terminal may determine the presentation priority of the first information in the current situation by using other algorithms and other implementation manners, which is not limited by this embodiment of the present invention.

Figure 2:
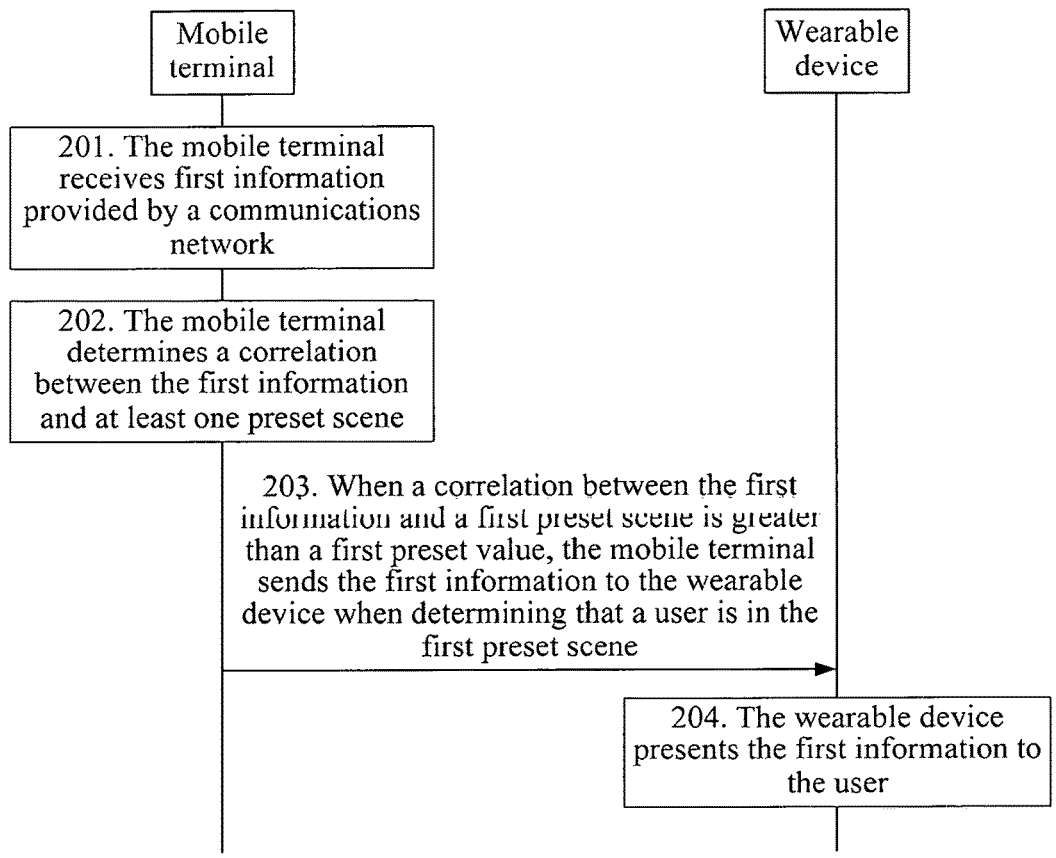
FIG. 2 is a signaling flowchart of Embodiment 2 of an information presentation method according to the present invention.

FIG. 2 is a signaling flowchart of Embodiment 2 of an information presentation method according to the present invention. This embodiment is jointly completed by a mobile terminal and a wearable device. Generally, a user may have both a mobile terminal and a wearable device, where the mobile terminal has a relatively more powerful processing capability than the wearable device, and can take various task analyzing and processing responsibilities; and the wearable device has a closest relationship to the user because of its wearable feature, and may be configured to provide a prompt of or present content of important and urgent information in real time. Implementation processes of methods in this embodiment and in the embodiment shown in FIG. 1 are different. As shown in FIG. 2, the method in this embodiment may include:

Step 201: A mobile terminal receives first information provided by a communications network.

The first information may be various types of information, such as text information, image information, or audio/video information.

Step 202: The mobile terminal determines a correlation between the first information and at least one preset scene.

Specifically, the mobile terminal may parse the received first information and extract a related feature. By using text information as an example, the extracted feature may include: a feature of an original author of the information; a social relationship between the original author of the information and the user; a content feature, for example, which words are included in content, frequency at which these words appear, whether a keyword or symbol is included, and a similarity between information that the user likes in history and the information; and a global feature, for example, how many users also like the information in a global range, and how much other information includes a link pointing to the information.

Then, the correlation between the first information and each preset scene is calculated according to a certain algorithm. The preset scene may include, for example, at work, at home, and on the road, and a content feature of information to which a user pays attention in a corresponding specific scene may be defined by using a scene model. A degree of attention that the user pays to the first information in each corresponding preset scene, that is, the correlation between the first information and each preset scene may be learned by calculating a user evaluation score for the first information in each scene model.

In a specific implementation, the mobile terminal may calculate a correlation between the first information and at least one preset scene according to a feature vector of the information and a scene model matrix, where the correlation may be a real number.

Before that, the mobile terminal first establishes a scene model, and in a preferable implementation manner, the scene model may include at least three types of features: basic scene feature, information category feature, and keyword feature, where the basic scene feature is used to represent a specific scene, the information category feature is used to represent an interest category of the user, and the keyword feature is used to represent a specific point of interest of the user.

The basic scene feature is, for example, a time, a geographical location, and light, and is used to represent a specific scene, and generally, may be a scene in the real world, for example, at work, at home, or on the road; the information category feature is, for example, entertainment, sports, or finance and economics, and is used to represent an interest category of the user; and the keyword feature is a keyword extracted from the information, and is used to represent a point of interest, with a finer granularity, of the user, for example, the $18^{th}$ National Congress of the Communist Party of China, or the Olympic Games.

A specific parameter of a user scene model may be acquired by means of machine learning. The user scene model describes scores for the content feature after the content feature extracted from the information is mapped to the three dimensions: the basic scene feature, the information category feature, and the keyword feature, and in a specific application process, the user scene model is presented in a form of a matrix.

Optionally, the established scene model may be obtained according to a browsing history record of the first information, and specifically, the mobile terminal establishes the scene model according to the browsing history record, where the browsing history record of the first information includes: a record time, a basic scene feature when the first information is received, an information category feature of the first information, a keyword feature of the first information, and reading action information of the user, where browsing history records corresponding to different record times have a same weight or different weights. For example, it may be set that: a history record that is close to a current time in time has a higher weight, and a history record that is far from the current time in time has a lower weight.

In a training phase, obtained historical information is expressed in a form of a matrix, and a record in each piece of information is one row in the matrix, and includes a basic scene feature, an information category feature, a keyword feature, an information content feature, and a score given by the user for the information.

In an implementation manner, a range of values of the evaluation score given by the user for the information is set to, for example, 1 to 5, and the score may be acquired according to a reading action that is of the user and used as an implicit feedback. As an implementation manner, a mapping relationship between reading actions of the user and evaluation scores for the information may be as follows:

null: no evaluation of the user on the information is obtained;

1: the user sets the information as junk information;

2: the user fines not click or read the information;

3: browsing roughly (for example, a reading time is less than 1 minute);

4: reading carefully (for example, a reading time is more than 3 minutes); and

5: reading for a long time and forwarding (for example, a reading time is more than 3 minutes and the information is forwarded).

The mobile terminal may provide each piece of information with a score of the user according to the foregoing mapping relationship, and learn accordingly to obtain user scene models corresponding to different scenes, for example, the $i^{th}$ preset scene is Si, and a scene model corresponding thereto is Ui.

Step 203: If a correlation between the first information and a first preset scene is greater than a first preset value, the mobile terminal sends the first information to a wearable device when determining that a user is in the first preset scene.

Correspondingly, if it is determined that the correlation between the first information and each preset scene is less than the first preset value, the first information may be used as junk information and the first information is deleted or filtered out.

Herein, the mobile terminal may acquire a parameter used to determine the basic scene feature, identify whether the current situation is the first preset scene, and send the first information to the wearable device when determining that the user is in the first preset scene.

Alternatively, a correlation between the current situation of the user and a scene {Si} corresponding to each scene model {Ui} may also be calculated according to the basic scene feature, that is, a set {wi} of similarity values between the current situation of the user and the scenes {Si} corresponding to the scene models {Ui} is separately calculated on each dimension.

Optionally, a score set {Vi}, corresponding to the scene models {Ui}, of the first information may be further calculated according to the set {wi} of similarity values, the presentation priority of the first information is calculated, and the first information is sent to the wearable device when the presentation priority is greater than or equal to a second preset value.

Specifically, the presentation priority of the first information may be calculated by using the following formula:

$$P=w1*V1+w2*V2+\ldots wj*Vj$$

where Vi is a score for the information in the scene model Ui; wi is a similarity value between the current situation of the user and the scene Si corresponding to the scene model Ui; and P is the presentation priority of the first information.

Further, when the mobile terminal determines that the user is not in the first preset scene currently, or the presentation priority of the first information is less than the second preset value, the mobile terminal may perform step 203 again after waiting for a certain period of time, to find a suitable opportunity for presenting the first information.

Step 204: The wearable device presents the first information to the user.

Further, after that, the wearable device may further capture reading action information of the user, and send the reading action information of the user to the mobile terminal, and after receiving the information, the mobile terminal may parse a content feature of the information, and update the user scene model accordingly.

A common reading action of the user that needs to be captured may be as follows: whether the user sets the information as junk information, whether the user clicks and reads the information, the user roughly or carefully browses the information, the user reads the information for a long time and forwards the information, and the like. These actions are used as implicit feedbacks and may be used to acquire a situation about a score given by the user for the information, so as to use the information as a corpus for an update, to update the user scene model. Particularly, for content to which the user pays special attention, for example, content that is read for a long time and forwarded by the user (an implicit score given by the user is 5), a keyword of the read content may be acquired, and a specific event of the content to which the user pays attention may be extracted precisely, so as to update a keyword feature of the user scene model.

Updating the user scene model is adding an obtained latest reading record of the user to a training corpus, and recalculating a user scene matrix. Specifically, model updating and learning may include the following two methods: keeping a size of a training corpus constant, continuously adding new records, and deleting earliest records; or assigning a different weight to each record according to a time sequence.

In this embodiment, after receiving first information provided by a communications network, a mobile terminal determines a correlation between the first information and at least one preset scene, and if a correlation between the first information and a first preset scene is greater than a first preset value, the mobile terminal sends the first information to a wearable device when determining that a user is in the first preset scene, so that the wearable device presents the first information to the user. That is, it can be implemented that only important and urgent information or information strongly related to a current situation of the user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

Figure 3:
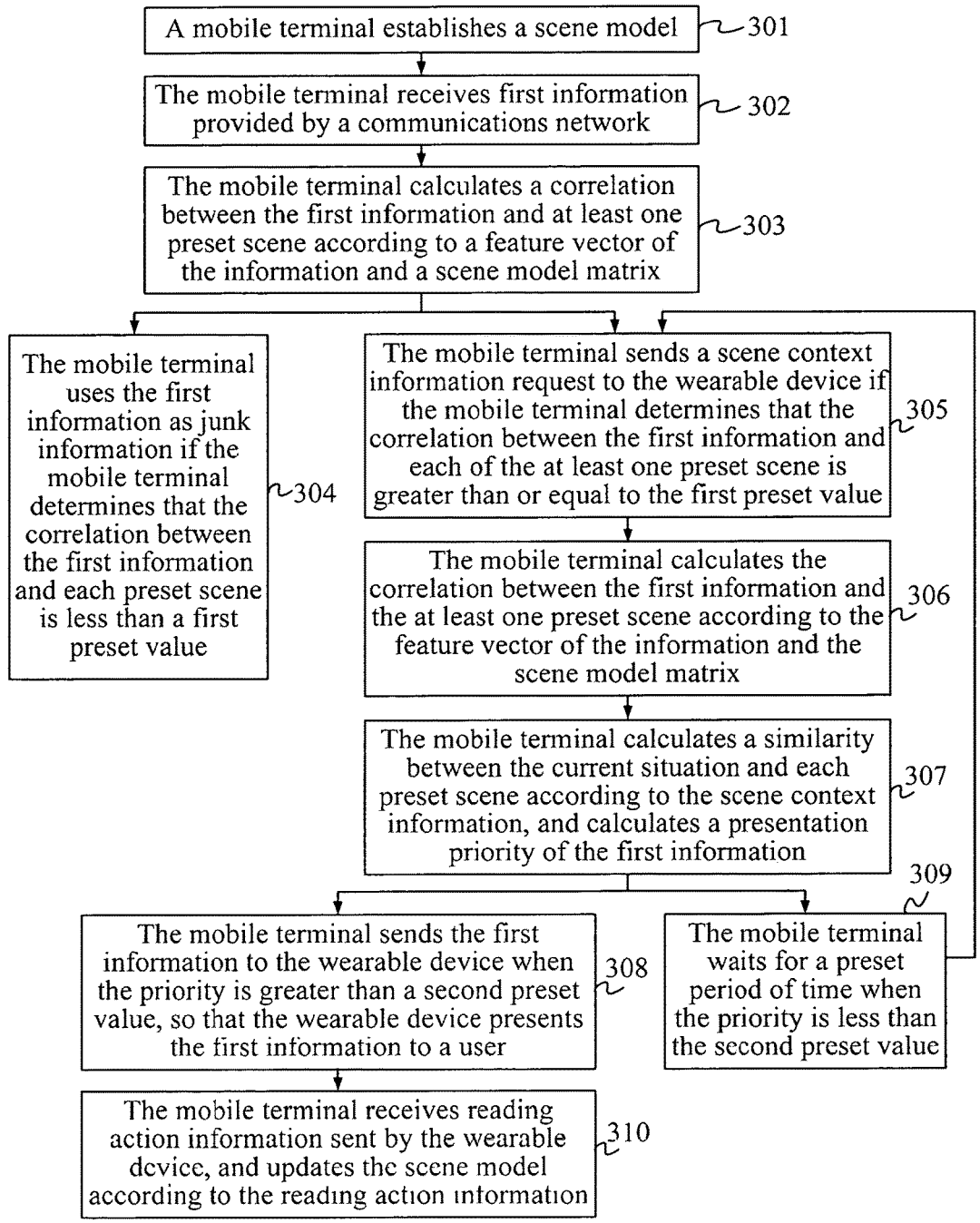
FIG. 3 is a flowchart of Embodiment 3 of an information presentation method according to the present invention.

FIG. 3 is a flowchart of Embodiment 3 of an information presentation method according to the present invention. This embodiment is jointly completed by a mobile terminal and a wearable device, where the mobile terminal is, for example, a mobile terminal, and the wearable device is, for example, a smart watch. However, FIG. 3 only shows steps performed by the mobile terminal. Based on the embodiment shown in FIG. 2, in this embodiment, a process of establishing a scene model by the mobile terminal is added. As shown in FIG. 3, the method in this embodiment may include:

Step 301: A mobile terminal establishes a scene model.

The scene model includes at least one scene and at least one piece of information, and the scene model includes at least the following three types of features: basic scene feature, information category feature, and keyword feature, where the basic scene feature is used to represent a specific scene, the information category feature is used to represent an interest category of a user, and the keyword feature is used to represent a specific point of interest of the user.

Specifically, the basic scene feature is, for example, a time, a geographical location, and light, and is used to represent a specific scene, and generally, may be a scene in the real world, for example, at work, at home, or on the road; the information category feature is, for example, entertainment, sports, or finance and economics, and is used to represent an interest category of the user; and the keyword feature is a keyword extracted from the information, and is used to represent a point of interest, with a finer granularity, of the user, for example, the 18$^{th}$ National Congress of the Communist Party of China, or the Olympic Games.

A specific parameter of a user scene model may be acquired by means of machine learning. The user scene model describes scores for the content feature after the content feature extracted from the information is mapped to the three dimensions: the basic scene feature, the information category feature, and the keyword feature, and in a specific application process, the user scene model is presented in a form of a matrix.

Optionally, the established scene model may be obtained according to a browsing history record, and specifically, the mobile terminal establishes the scene model according to the browsing history record, where information in the browsing history record has a same weight or different weights according to a time at which the information is browsed. For example, it may be set that: a history record that is close to a current time in time has a higher weight, and a history record that is far from the current time in time has a lower weight.

Figures 4, 5:
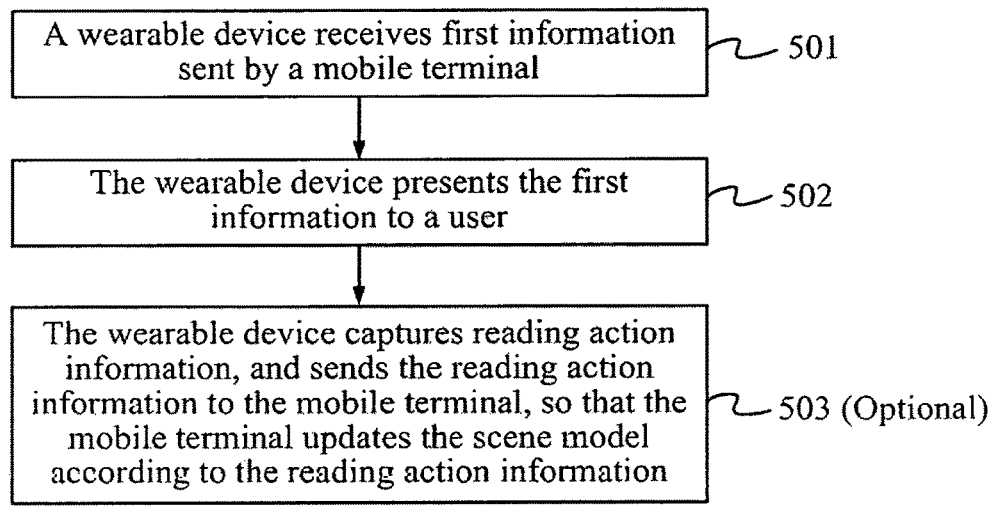
FIG. 4 is a schematic diagram of an example of a user scene training model.
FIG. 5 is a flowchart of Embodiment 4 of an information presentation method according to the present invention.

As shown in FIG. 4, FIG. 4 is a schematic diagram of an example of a user scene training model. In a training phase, obtained historical information is expressed in a form of a matrix shown in FIG. 4, and a record in each piece of information is one row in the matrix, and includes a basic scene feature, an information category feature, a keyword feature, an information content feature, and a score given by the user for the information.

In an implementation manner, a range of values of the evaluation score given by the user for the information is set to, for example, 1 to 5, and the score may be acquired according to a reading action that is of the user and used as an implicit feedback. As an implementation manner, a mapping relationship between reading actions of the user and evaluation scores for the information may be as follows:

null: no evaluation of the user on the information is obtained;

1: the user sets the information as junk information;

2: the user dues not click or read the information;

3: browsing roughly (for example, a reading time is less than 1 minute);

4: reading carefully (for example, a reading time is more than 3 minutes); and

5: reading for a long time and forwarding (for example, a reading time is more than 3 minutes and the information is forwarded).

The mobile terminal may provide each piece of information with a score of the user according to the foregoing mapping relationship, and learn accordingly to obtain user scene models corresponding to different scenes, for example, the preset scene is Si, and a scene model corresponding thereto is Ui.

In an actual application, because of relatively high dimensionality of a matrix, dimension reduction processing may be performed on the matrix by using a matrix decomposition technology, for example, a high-dimensionality matrix may be converted into a product of two matrices: (scene-hidden state) and (hidden state-information) by using a singular value decomposition (SVD) technology. Then, after obtaining one piece of new information, an actual online application system still extracts a content feature of the new information and converts the content feature into a vector form, and separately calculates a score for the content feature in each scene. In addition, context information of a current situation is calculated, and a scene best matching the current situation is predicted.

Step 302: The mobile terminal receives first information provided by a communications network.

Step 303: The mobile terminal calculates a correlation between the first information and at least one preset scene according to a feature vector of the information and a scene model matrix.

The scene model matrix is obtained by means of calculation according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

Specifically, when the first information is received for the first time, the mobile terminal may separately calculate a correlation between the information and each corresponding scene model {Ui}, where the correlation may be a real number.

Step 304: The mobile terminal uses the first information as junk information if the mobile terminal determines that the correlation between the first information and each preset scene is less than a first preset value.

If each score that is for the first information and obtained by means of calculation is less than the first preset value, it is determined that the first information is junk information; otherwise, the score set {Vi} is saved. In a possible implementation manner, the first preset value may be set to 3, that is, corresponding to "browsing roughly" in the user reading action, that is, information that the user does not browse carefully at all is used as junk information and is directly filtered out.

Step 305: The mobile terminal sends a scene context information request to the wearable device if the mobile terminal determines that the correlation between the first information and each of the at least one preset scene is greater than or equal to the first preset value.

A preset scene whose correlation with the first information is greater than or equal to the first preset value is referred to as a first scene, and scene context information is used to determine whether a current situation is the first scene, that is, determine whether it is suitable to push the first information in the current situation.

Step 306: The mobile terminal acquires scene context information from the wearable device.

The scene context information is used to determine a current situation of the user.

Step 307: The mobile terminal calculates a similarity between the current situation and each preset scene according to the scene context information, and calculates a presentation priority of the first information.

Step 308: The mobile terminal sends the first information to the wearable device when the priority is greater than a second preset value, so that the wearable device presents the first information to a user.

When the priority is greater than the second preset value, it may be determined that the information is strongly related to the current situation of the user, and the information is pushed immediately.

Step 309: When the priority is less than the second preset value, the mobile terminal performs step 305 to step 308 again after waiting for a preset period of time.

Specifically, a timer may be started, and step 305 to step 308 are performed again after a wait of a certain period of time, that is, a scene context information request is sent to the wearable device, and a presentation priority of the first information in a current situation of the user is determined again.

As a possible embodiment, the second preset value may be set to 3, that is, only information that is read by the user carefully is information strongly related to the current situation of the user.

Step 310: The mobile terminal receives reading action information sent by the wearable device, and updates the scene model according to the reading action information.

By analyzing the reading action information, a latest interest of the user may be acquired, so that matching between the information and a scene of the user is more accurate.

In this embodiment, a mobile terminal establishes a scene model of a user, and determines accordingly whether it is suitable to present currently received information to the user, so as to implement a method of pushing information according to a current situation of a user, reduce disturbance to the user, and improve the effectiveness of information presentation; and the mobile terminal receives reading action information of the user, and updates the scene model according to the reading action information, so as to improve the accuracy of matching between the information and a scene of the user.

FIG. 5 is a flowchart of Embodiment 4 of an information presentation method according to the present invention. A reading action is analyzed, and this embodiment is executed by a wearable device; the method in this embodiment may be combined with the method that is shown in FIG. 3 and performed by a mobile terminal, to complete information presentation in a scene of a user. As shown in FIG. 5, the method in this embodiment may include:

Step 501: A wearable device receives first information sent by a mobile terminal.

The first information is received by the mobile terminal from a network side, and the mobile terminal determines that the first information is strongly related to a current situation of a user, that is, the mobile terminal sends the first information to the wearable device only after determining that a presentation priority in the current situation is greater than a second preset value. The first information may include any one of the following: text information, image information, audio information, and video information.

Step 502: The wearable device presents the first information to a user.

In this implementation manner, the wearable device directly presents the first information from the mobile terminal, that is, a process of analyzing whether the first information is strongly related to the current situation is completed by the mobile terminal, and the wearable device is only responsible for presenting the information.

Optionally, the method may include:

Step 503: The wearable device captures reading action information, and sends the reading action information to the mobile terminal, so that the mobile terminal updates the scene model according to the reading action information.

The reading action information at least includes: whether the first information is deleted, whether the first information is read, duration of reading the first information, and whether the first information is forwarded.

In this embodiment, first information sent by a mobile terminal is received, a correlation between the first information and a current situation of a user is determined, and the wearable device presents the first information to the user when the correlation is greater than or equal to a third preset value, so as to implement that only important and urgent information or information strongly related to the current situation of the user is pushed or presented according to the current situation of the user. Therefore, interference of information unrelated to the current situation with the user can be reduced, Moreover, because the presented information is needed by the user, a possibility of carefully reading the information by the user can be increased, and a presentation effect can be improved.

Further, the wearable device may further receive a scene context information request sent by the mobile terminal, and sends scene context information to the mobile terminal. Therefore, the mobile terminal can determine, according to the scene context information, a preset scene to which the current situation belongs, or determine a similarity between the current situation and each preset scene.

Figure 6:
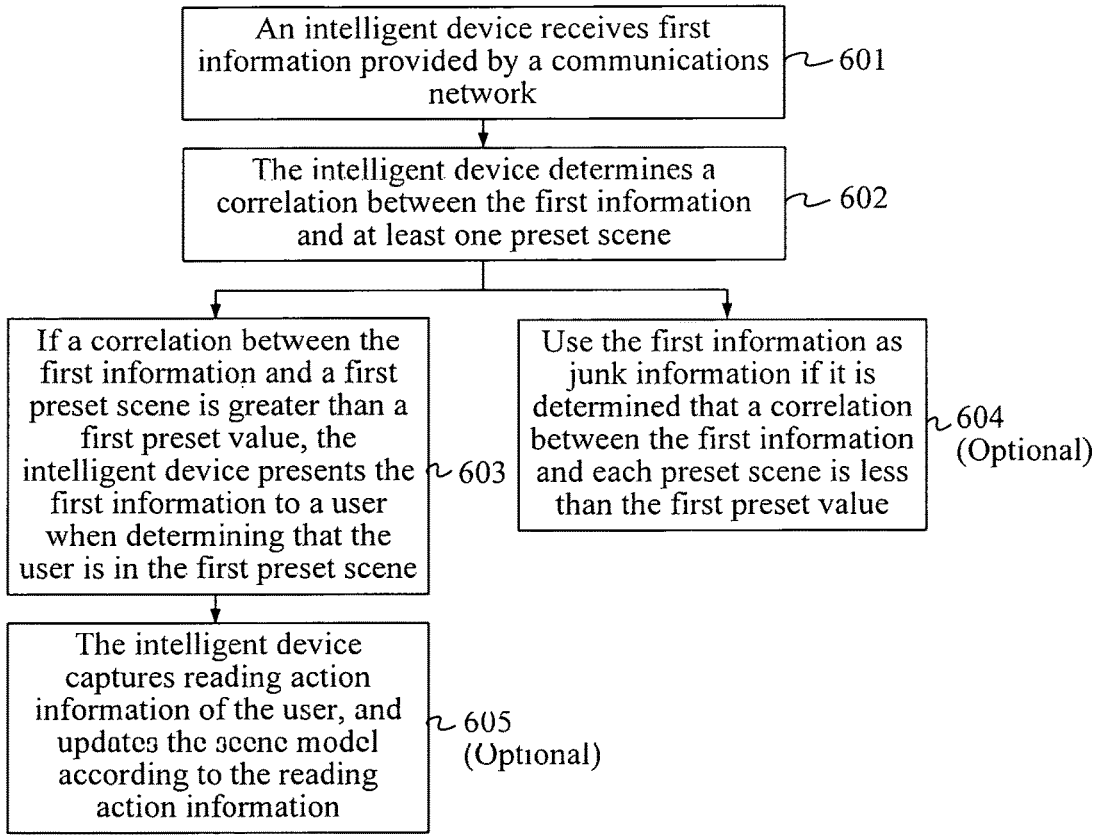
FIG. 6 is a flowchart of Embodiment 5 of an information presentation method according to the present invention.

FIG. 6 is a flowchart of Embodiment 5 of an information presentation method according to the present invention. In this embodiment, an entire process of receiving information from a network side, analyzing the information and a scene which a user is in, and presenting the information is independently completed by an intelligent device. The intelligent device in this embodiment may be a mobile terminal or a wearable device; for example, the information presentation method may be independently completed by the mobile terminal or a smart watch. As shown in FIG. 6, the method in this embodiment may include:

Step 601: An intelligent device receives first information provided by a communications network.

The first information may be various types of information, such as text information, image information, or audio/video information.

Step 602: The intelligent device determines a correlation between the first information and at least one preset scene.

Specifically, the intelligent device may parse the received first information and extract a related feature. By using text information as an example, the extracted feature may include: a feature of an original author of the information; a social relationship between the original author of the information and a user; a content feature, for example, which words are included in content, frequency at which these words appear, whether a keyword or symbol is included, and a similarity between information that the user likes in history and the information; and a global feature, for example, how many users also like the information in a global range, and how much other information includes a link pointing to the information.

Then, the correlation between the first information and each preset scene is calculated according to a certain algorithm. The preset scene may include, for example, at work, at home, and on the road, and a content feature of information to which a user pays attention in a corresponding specific scene may be defined by using a scene model. A degree of attention that the user pays to the first information in each corresponding preset scene, that is, the correlation between the first information and each preset scene may be learned by calculating a user evaluation score for the first information in each scene model.

In a specific implementation, the intelligent device may calculate a correlation between the first information and at least one preset scene according to a feature vector of the information and a scene model matrix, where the correlation may be a real number.

Optionally, before that, further, before the determining, by the intelligent device, a correlation between the first information and at least one preset scene, the method further includes:

establishing, by the intelligent device, a scene model, where the scene model includes at least one scene and at least one piece of information. In a preferable implementation manner, the scene model includes at least the following three types of features: basic scene feature, information category feature, and keyword feature, where the basic scene feature is used to represent a specific scene, the information category feature is used to represent an interest category of a user, and the keyword feature is used to represent a specific point of interest of the user.

The basic scene feature is, for example, a time, a geographical location, and light, and is used to represent a specific scene, and generally, may be a scene in the real world, for example, at work, at home, or on the road; the information category feature is, for example, entertainment, sports, or finance and economics, and is used to represent an interest category of the user; and the keyword feature is a keyword extracted from the information, and is used to represent a point of interest, with a finer granularity, of the user, for example, the $18^{th}$ National Congress of the Communist Party of China, or the Olympic Games.

A specific parameter of a user scene model may be acquired by means of machine learning. The user scene model describes scores for the content feature after the content feature extracted from the information is mapped to the three dimensions: the basic scene feature, the information category feature, and the keyword feature, and in a specific application process, the user scene model is presented in a form of a matrix.

Optionally, the established scene model may be obtained according to a browsing history record, and specifically, the intelligent device establishes the scene model according to the browsing history record, where information in the browsing history record has a same weight or different weights according to a time at which the information is browsed. For example, it may be set that: a history record that is close to a current time in time has a higher weight, and a history record that is far from the current time in time has a smaller weight.

In a training phase, obtained historical information may be expressed in a form of a matrix, that is, a scene matrix model is established, and a record in each piece of information is one row in the matrix, and includes a basic scene feature, an information category feature, a keyword feature, an information content feature, and a score given by the user for the information.

In an implementation manner, a range of values of the evaluation score given by the user for the information is set to, for example, 1 to 5, and the score may be acquired according to a reading action that is of the user and used as an implicit feedback. As an implementation manner, a mapping relationship between reading actions of the user and evaluation scores for the information may be as follows:

null: no evaluation of the user on the information is obtained;

1: the user sets the information as junk information;

2: the user does not click or read the information;

3: browsing roughly (for example, a reading time is less than 1 minute);

4: reading carefully (for example, a reading time is more than 3 minutes); and

5: reading for a long time and forwarding (for example, a reading time is more than 3 minutes and the information is forwarded).

The intelligent device may provide each piece of information with a score of the user according to the foregoing mapping relationship, and learn accordingly to obtain user scene models corresponding to different scenes, for example, the $i^{th}$ preset scene is Si, and a scene model corresponding thereto is Ui.

In an actual application, because of relatively high dimensionality of a scene matrix, dimension reduction processing may be performed on the matrix by using a matrix decomposition technology, for example, a high-dimensionality matrix may be converted into a product of two matrices: (scene-hidden state) and (hidden state-information) by using a singular value decomposition (SVD) technology. Then, after obtaining one piece of new information, an actual online application system still extracts a content feature of the new information and converts the content feature into a vector form, and separately calculates a score for the content feature in each scene.

Specifically, the intelligent device may calculate the correlation between the first information and the at least one preset scene according to the feature vector of the information and the scene model matrix, where the correlation may be a real number.

Step 603: If a correlation between the first information and a first preset scene is greater than a first preset value, the intelligent device presents the first information to a user when determining that the user is in the first preset scene.

Optionally, step 603 may include the following sub-steps:

Sub-step 1: The intelligent device acquires scene context information, where the scene context information is used to determine a current situation of the user.

Sub-step 2: The intelligent device calculates a similarity between the current situation and each preset scene according to the scene context information.

Sub-step 3: The intelligent device calculates a presentation priority of the first information in the current situation according to the similarity between the current situation and each preset scene and the correlation between the first information and each preset scene, and presents the first information to the user when the priority is greater than a second preset value.

In a specific implementation, the similarity between the current situation and each preset scene may be calculated by using the foregoing scene matrix and according to context information of the current situation, and a scene best matching the current situation is predicted.

In addition, scores corresponding to the scene models {Ui} are separately calculated for the information; if the correlation between the first information and the first preset scene is greater than the first preset value, it indicates that the first information is content to which the user pays attention in at least one scene (referred to as a first scene), and it is determined whether the current situation is the first scene, where whether the current situation is the first scene may be determined by calculating the presentation priority of the first information.

Specifically, the presentation priority of the first information is compared with the second preset value, and if the presentation priority is greater than the second preset value, it is determined that the first information is strongly related to the current situation of the user, and the information is pushed immediately.

Optionally, when the priority is less than the second preset value, step 603 may be performed again after a wait of a preset period of time.

Specifically, for sub-step 1, the intelligent device may acquire the scene context information by managing one or more context data sources, where the one or more context data sources include but are not limited to various types of sensors, social media records, application logs, and the like, and are used to acquire a current environment of the user and context information of a user behavior. Methods for acquiring various kinds of context information include but are not limited to: obtaining time information by using a clock of a local apparatus and/or a time server; obtaining geographical location information by using a GPS and/or by means of cellular triangulation measurement; detecting, by using a microphone, whether the current environment is noisy; detecting the intensity of ambient light by using a light sensor; detecting, by using a movement sensor, whether the user moves; marking a behavior and an activity of the user by using a social media record; acquiring information, such as a schedule, of the user by using an application log such as an email, a contact, and a calendar.

For sub-step 2, after acquiring the context information, the intelligent device may separately calculate, on each dimension, similarity values between the current situation of the user and scenes {Si} corresponding to the scene models {Ui}.

For sub-step 3, a manner of calculating a presentation priority P of the first information may be as follows:

$$P = w1*V1 + w2*V2 + \ldots wj*Vj$$

where Vi is a score for the information in the scene model Ui; and wi is the similarity value between the current situation of the user and the scene Si corresponding to the scene model Ui.

Further, after the intelligent device determines the correlation between the first information and the at least one preset scene, the following optional step 604 may be further included:

Step 604: Use the first information as junk information if it is determined that the correlation between the first information and each preset scene is less than the first preset value.

Specifically, when the correlation between the first information and the preset scene is calculated, if it is obtained by means of calculation that each score for the information is less than the first preset value, it is determined that the information is junk information; otherwise, the score set {Vi} is saved. In a possible embodiment, the first preset value may be set to 3, that is, corresponding to "browsing roughly" in the user reading action, that is, information that the user does not browse at all is used as junk information and is directly filtered out.

Further, after the intelligent device presents the first information to the user, the following optional step 605 may be further included:

Step 605: The intelligent device captures reading action information of the user, and updates the scene model according to the reading action information.

Specifically, the intelligent device captures the reading action information of the user, uses the reading action information as an implicit feedback of the user for a current scene model, parses a content feature of the information, and updates the user scene model accordingly. A common reading action of the user that needs to be captured may be as follows: whether the user sets the information as junk information, whether the user clicks and reads the information, the user roughly or carefully browses the information, the user reads the information for a long time and forwards the information, and the like. These actions are used as implicit feedbacks and may be used to acquire a situation about a score given by the user for the information, so as to use the information as a corpus for an update, to update the user scene model. Particularly, for content to which the user pays special attention, for example, content that is read for a long time and forwarded by the user (an implicit score given by the user is 5), a keyword of the read content may be acquired, and a specific event of the content which the user pays attention to may be extracted precisely, so as to update a keyword feature of the user scene model.

A corresponding user scene model is updated according to a captured action feedback of the user and the extracted content feature. That is, an obtained latest reading record of the user is added to a training corpus, and a user scene matrix is recalculated. Specifically, model updating and learning may include the following two methods: (1) keeping a size of a training corpus constant, continuously adding new records, and deleting earliest records; and (2) assigning a different weight to each record according to a time sequence.

In this embodiment, after receiving first information provided by a communications network, an intelligent device determines a correlation between the first information and at least one preset scene, and if a correlation between the first information and a first preset scene is greater than a first preset value, the intelligent device presents the first information to a user when determining that the user is in the first preset scene. That is, it can be implemented that only important and urgent information or information strongly related to the current situation of the user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

Figure 7:
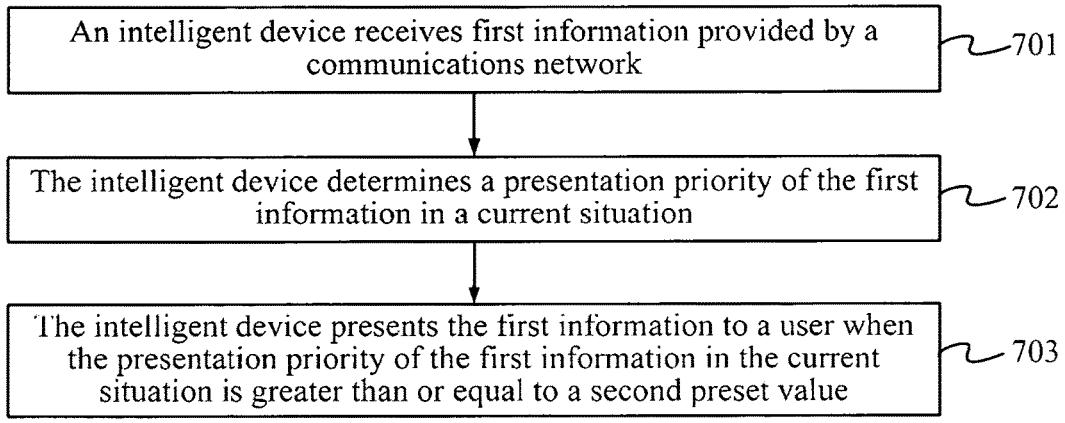
FIG. 7 is a flowchart of Embodiment 6 of an information presentation method according to the present invention.

FIG. 7 is a flowchart of Embodiment 6 of an information presentation method according to the present invention. In this embodiment, an entire process of receiving information from a network side, analyzing the information and a scene which a user is in, and presenting the information is independently completed by an intelligent device. The intelligent device in this embodiment may be a mobile terminal or a wearable device; for example, the information presentation method may be independently completed by the mobile terminal or a smart watch. A difference between this embodiment and the embodiment shown in FIG. 6 lies in that, instead of determining whether first information is junk information first and then determining whether it is suitable to present the first information currently, in this embodiment, the intelligent device directly determines a priority of the first information after receiving the first information. As shown in FIG. 7, the method in this embodiment may include:

Step 701: An intelligent device receives first information provided by a communications network.

The first information includes any one of the following: text information, image information, audio information, and video information.

Step 702: The intelligent device determines a presentation priority of the first information in a current situation.

Specifically, there may be multiple methods for determining the presentation priority of the first information in the current situation, for example, a preset scene corresponding to the first information may be first determined, and then, it is determined, according to scene context, whether the current situation of a user matches the preset scene corresponding to the first information, if yes, it is determined that the presentation priority of the first information in the current situation is relatively high; or otherwise, the presentation priority of the first information in the current situation is relatively low. For another example, scene context information may be first acquired; a similarity between the current situation and each preset scene is calculated according to the scene context information, and a correlation between the first information and the preset scene is calculated; and then, the presentation priority of the first information is calculated according to the similarity and the correlation between the first information and the preset scene. The foregoing descriptions are only examples of determining the presentation priority, and this embodiment of the present invention is not limited thereto.

Step 703: The intelligent device presents the first information to a user when the presentation priority of the first information in the current situation is greater than or equal to a second preset value.

Correspondingly, when the presentation priority of the first information in the current situation is less than the second preset value, step 702 and step 703 are performed again after a wait of a preset period of time. Specifically, scene context information may be acquired again after a wait of a preset period of time; a similarity between a current situation and each preset scene is calculated according to the scene context information; and the presentation priority of the first information is calculated according to the similarity and the correlation between the first information and the preset scene. When the presentation priority of the first information in the current situation is greater than or equal to the second preset value, the intelligent device presents the first information to the user.

Further, after that, the intelligent device may further capture reading action information of the user, and send the reading action information of the user to the mobile terminal, and after receiving the information, the mobile terminal may parse a content feature of the information, and update the user scene model accordingly.

A common reading action of the user that needs to be captured may be as follows: whether the user sets the information as junk information, whether the user clicks and reads the information, the user roughly or carefully browses the information, the user reads the information for a long time and forwards the information, and the like. These actions are used as implicit feedbacks and may be used to acquire a situation about a score given by the user for the information, so as to use the information as a corpus for an update, to update the user scene model. Particularly, for content to which the user pays special attention, for example, content that is read for a long time and forwarded by the user (an implicit score given by the user is 5), a keyword of the read content may be acquired, and a specific event of the content which the user pays attention to may be extracted precisely, so as to update a keyword feature of the user scene model.

Updating the user scene model is adding an obtained latest reading record of the user to a training corpus, and recalculating a user scene matrix. Specifically, model updating and learning may include the following two methods: keeping a size of a training corpus constant, continuously adding new records, and deleting earliest records; or assigning a different weight to each record according to a time sequence.

In this embodiment, after receiving first information provided by a communications network, an intelligent device determines a presentation priority of the first information in a current situation, and presents the first information to a user. That is, it can be implemented that only important and urgent information or information strongly related to the current situation of the user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

Figure 8:
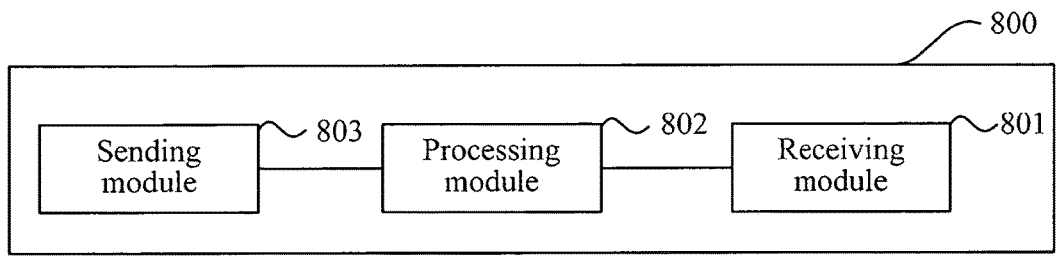
FIG. 8 is a schematic structural diagram of Embodiment 1 of an information filtering apparatus according to the present invention.

FIG. 8 is a schematic structural diagram of Embodiment 1 of an information filtering apparatus according to the present invention. As shown in FIG. 8, an apparatus 800 in this embodiment may include: a receiving module 801, a processing module 802, and a sending module 803.

The receiving module 801 is configured to receive first information provided by a communications network, where the first information includes any one of the following: text information, image information, audio information, and video information.

The processing module 802 is configured to determine a presentation priority of the first information in a current situation of a user.

The sending module 803 is configured to send the first information to a wearable device when the presentation priority of the first information in the current situation is greater than or equal to a second preset value, so that the wearable device presents the first information to the user.

Optionally, the processing module 802 may be specifically configured to:

acquire scene context information of the wearable device from the wearable device, where the scene context information is used to determine the current situation of the user; and calculate, according to the scene context information, a preset scene matching the current situation, and calculate a correlation between the first information and the preset scene; and determine the presentation priority of the first information in the current situation according to the correlation.

Optionally, the processing module 802 may be further configured to:

when the presentation priority of the first information in the current situation is less than the second preset value, perform a step of the determining a presentation priority of the first information in a current situation again after waiting for a preset period of time, that is, acquire scene context information of the wearable device from the wearable device again after waiting for the preset period of time, where the scene context information is used to determine a current situation of the user; calculate, according to the scene context information, a preset scene matching the current situation, and calculate a correlation between the first information and the preset scene; and determine a presentation priority of the first information in the current situation according to the correlation.

Optionally, the processing module 802 is further configured to:

establish a scene model, where the scene model is used to determine the correlation between the first information and the preset scene, and the scene model includes at least the following three types of features: basic scene feature, information category feature, and keyword feature.

Optionally, the processing module 802 is specifically configured to:

parse a feature of the first information, and calculate the correlation between the first information and the preset scene according to the scene model.

Optionally, the processing module 802 is specifically configured to:

establish the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

Optionally, the receiving module 801 may be further configured to:

after the first information is sent to the wearable device when the presentation priority of the first information in the current situation is greater than the second preset value, to enable the wearable device to present the first information to the user, receive the reading action information sent by the wearable device, and update the scene model according to the reading action information.

Figure 10:
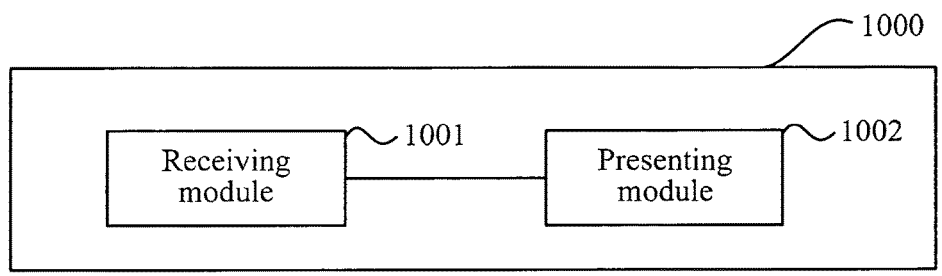
FIG. 10 is a schematic structural diagram of Embodiment 1 of an information presentation apparatus according to the present invention.

The apparatus in this embodiment may cooperate with an information presentation apparatus shown in FIG. 10, and is configured to execute the technical solution in the method embodiment shown in FIG. 1; and implementation principles thereof are similar, and are not repeatedly described herein.

According to the apparatus in this embodiment, after receiving first information provided by a communications network, a mobile terminal determines a presentation priority of the first information in a current situation, and sends the first information to a wearable device, so that the wearable device presents the first information to a user. That is, it can be implemented that only important and urgent information or information strongly related to the current situation of the user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

Figure 9:
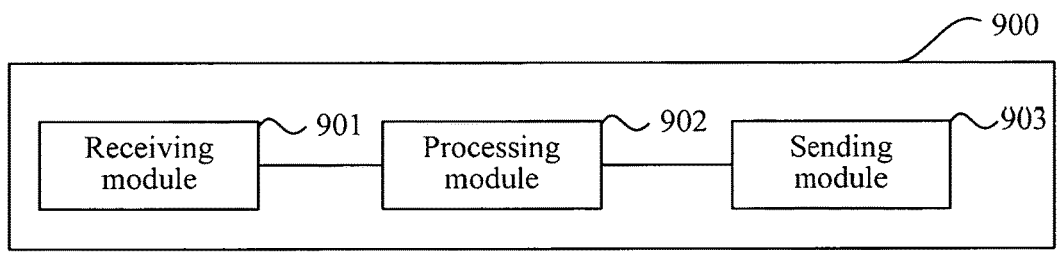
FIG. 9 is a schematic structural diagram of Embodiment 2 of an information filtering apparatus according to the present invention.

FIG. 9 is a schematic structural diagram of Embodiment 2 of an information filtering apparatus according to the present invention. As shown in FIG. 9, an apparatus 900 in this embodiment may include: a receiving module 901, a processing module 902, and a sending module 903.

The receiving module 901 is configured to receive first information provided by a communications network, where the first information includes any one of the following: text information, image information, audio information, and video information.

The processing module 902 is configured to determine a correlation between the first information and at least one preset scene; and determine a presentation priority of the first information in a current situation of a user when the correlation between the first information and at least one of the preset scenes is greater than or equal to a first preset value.

The sending module 903 is configured to send the first information to a wearable device when the presentation priority of the first information in the current situation is greater than or equal to a second preset value, so that the wearable device presents the first information to the user.

Optionally, the processing module 902 may be further configured to:

after determining the correlation between the first information and the at least one preset scene, use the first information as junk information when the correlation between the first information and each preset scene is less than the first preset value.

Optionally, the processing module 902 is specifically configured to:

acquire scene context information of the wearable device from the wearable device, where the scene context information is used to determine the current situation of the user; and calculate a similarity between the current situation and each preset scene according to the scene context information; and calculate the presentation priority of the first information according to the similarity and the correlation between the first information and the preset scene.

Optionally, the processing module 902 is further configured to:

after determining the presentation priority of the first information in the current situation, when the presentation priority of the first information in the current situation is less than the second preset value, perform a step of the determining a presentation priority of the first information in a current situation again after waiting for a preset period of time, that is, acquire scene context information of the wearable device from the wearable device again after waiting for the preset period of time, where the scene context information is used to determine a current situation of the user; calculate, according to the scene context information, a preset scene matching the current situation, and calculate a correlation between the first information and the preset scene; and determine a presentation priority of the first information in the current situation according to the correlation.

Optionally, the processing module 902 is further configured to:

establish a scene model before the mobile terminal determines the correlation between the first information and the at least one preset scene, where the scene model is used to determine the correlation between the first information and the preset scene, and the scene model includes at least the following three types of features: basic scene feature, information category feature, and keyword feature.

Optionally, the processing module 902 is specifically configured to:

parse a feature of the first information, and calculate the correlation between the first information and the at least one preset scene according to the scene model.

Optionally, the processing module 902 is specifically configured to:

establish the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

Optionally, the receiving module 901 is further configured to:

after the first information is sent to the wearable device when the presentation priority of the first information in the current situation is greater than the second preset value, to enable the wearable device to present the first information to the user, receive the reading action information sent by the wearable device, and update the scene model according to the reading action information.

Figure 11:
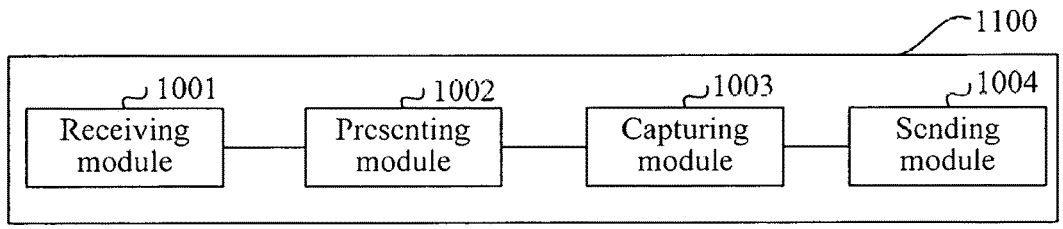
FIG. 11 is a schematic structural diagram of Embodiment 2 of an information presentation apparatus according to the present invention.

The apparatus in this embodiment may cooperate with an information presentation apparatus shown in FIG. 10 or FIG. 11, and is configured to execute the technical solution in the method embodiment shown in FIG. 2 or FIG. 3; and implementation principles thereof are similar, and are not repeatedly described herein.

In this embodiment, after receiving first information provided by a communications network, a mobile terminal determines a correlation between the first information and at least one preset scene, and if a correlation between the first information and a first preset scene is greater than a first preset value, the mobile terminal sends the first information to a wearable device when determining that a user is in the first preset scene, so that the wearable device presents the first information to the user. That is, it can be implemented that only important and urgent information or information strongly related to the current situation of the user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

FIG. 10 is a schematic structural diagram of Embodiment 1 of an information presentation apparatus according to the present invention. As shown in FIG. 10, an apparatus 1000 in this embodiment may include: a receiving module 1001 and a presenting module 1002.

The receiving module 1001 is configured to receive first information, where the first information is sent by a mobile terminal after the mobile terminal determines that a presentation priority in a current situation is greater than a second preset value, and the first information includes any one of the following: text information, image information, audio information, and video information.

The presenting module 1002 is configured to present the first information to a user.

The apparatus in this embodiment may cooperate with the information filtering apparatus shown in FIG. 8 or FIG. 9, and is configured to execute the technical solution in the method embodiment shown in FIG. 1, FIG. 2, or FIG. 3 and the technical solution in the method embodiment shown in FIG. 5; and the implementation principles thereof are similar, and are not repeatedly described herein.

In this embodiment, after receiving first information filtered by a mobile terminal, because of a correlation between the first information and at least one preset scene, if a correlation between the first information and a first preset scene is greater than a first preset value, it can be implemented that only important and urgent information or information strongly related to a current situation of a user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

FIG. 11 is a schematic structural diagram of Embodiment 2 of an information presentation apparatus according to the present invention. As shown in FIG. 11, based on the apparatus shown in FIG. 10, an apparatus 1100 in this embodiment may further include: a capturing module 1003 and a sending module 1004.

Optionally, the capturing module 1003 may be configured to capture reading action information after the presenting module 1002 presents the first information to the user, where the reading action information at least includes: whether the first information is deleted, whether the first information is read, duration of reading the first information, and whether the first information is forwarded; and the sending module 1004 may be configured to send the reading action information to the mobile terminal, so that the mobile terminal updates the scene model according to the reading action information.

Optionally, the receiving module 1001 is further configured to receive a scene context information request sent by the mobile terminal; and the sending module 1004 is further configured to send scene context information to the mobile terminal.

It should be noted that, the foregoing two optional manners are independent of each other and do not depend on each other.

Optionally, the presenting module 1002 may be specifically configured to:

send out prompt information.

The apparatus in this embodiment may cooperate with the information filtering apparatus shown in FIG. 8 or FIG. 9, and is configured to execute the technical solution in the method embodiment shown in FIG. 1, FIG. 2, or FIG. 3; and implementation principles and the technical effects thereof are similar, and are not repeatedly described herein.

Figure 12:
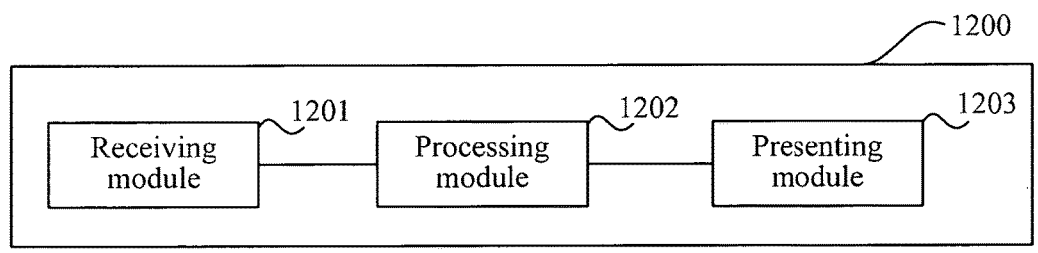
FIG. 12 is a schematic structural diagram of Embodiment 3 of an information presentation apparatus according to the present invention.

FIG. 12 is a schematic structural diagram of Embodiment 3 of an information presentation apparatus according to the present invention. An information presentation apparatus 1200 in this embodiment can independently complete a process of information receiving, filtering, and presentation. As shown in FIG. 12, the apparatus in this embodiment may include: a receiving module 1201, a processing module 1202, and a presenting module 1203.

The receiving module 1201 is configured to receive first information provided by a communications network, where the first information includes any one of the following: text information, image information, audio information, and video information.

The processing module 1202 is configured to determine a correlation between the first information and at least one preset scene; and determine a presentation priority of the first information in a current situation when the correlation between the first information and at least one of the preset scenes is greater than or equal to a first preset value.

The presenting module 1203 is configured to present the first information to a user when the presentation priority of the first information in the current situation is greater than or equal to a second preset value.

Optionally, the processing module 1202 is further configured to:

after the mobile terminal determines the correlation between the first information and the at least one preset scene, use the first information as junk information when the correlation between the first information and each preset scene is less than the first preset value.

Optionally, the processing module 1202 is specifically configured to:

acquire scene context information, where the scene context information is used to determine the current situation of the user;

calculate a similarity between the current situation and each preset scene according to the scene context information; and calculate the presentation priority of the first information according to the similarity and the correlation between the first information and the preset scene.

Optionally, the processing module 1202 is specifically configured to:

after determining the presentation priority of the first information in the current situation, when the presentation priority of the first information in the current situation is less than the second preset value, perform a step of the determining a presentation priority of the first information in a current situation again after waiting for a preset period of time, that is, acquire scene context information again after waiting for the preset period of time; calculate a similarity between a current situation and each preset scene according to the scene context information; and calculate a presentation priority of the first information according to the similarity and a correlation between the first information and a preset scene.

Optionally, the processing module 1202 may be further configured to:

establish a scene model before determining the correlation between the first information and the at least one preset scene, where the scene model is used to determine the correlation between the first information and the preset scene, and the scene model includes at least the following three types of features: basic scene feature, information category feature, and keyword feature.

Optionally, the processing module 1202 is specifically configured to:

parse a feature of the first information, and calculate the correlation between the first information and the at least one preset scene according to the scene model.

Optionally, the processing module 1202 is specifically configured to:

establish the scene model according to a browsing history record of the first information, where the browsing history record of the first information includes: a record time, a basic scene feature when the first information is received, an information category feature of the first information, a keyword feature of the first information, and reading action information of the user, where browsing history records corresponding to different record times have a same weight or different weights.

Optionally, the presenting module 1203 is specifically configured to:

send out prompt information.

The apparatus in this embodiment may be configured to execute the technical solution of the method embodiment shown in FIG. 6; and implementation principles thereof are similar, and are not repeatedly described herein.

In this embodiment, after receiving first information filtered by a mobile terminal, because of a correlation between the first information and at least one preset scene, if a correlation between the first information and a first preset scene is greater than a first preset value, it can be implemented that only important and urgent information or information strongly related to a current situation of a user is pushed or presented according to the current situation of the user. Therefore, interference of information unrelated to the current situation with the user can be reduced. Moreover, because the presented information is needed by the user, a possibility of carefully reading the information by the user can be increased, and a presentation effect can be improved.

Figure 13:
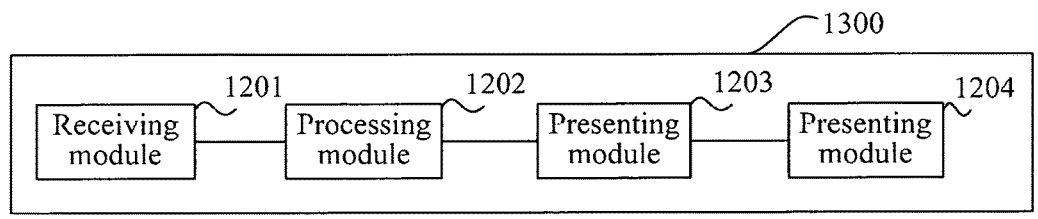
FIG. 13 is a schematic structural diagram of Embodiment 4 of an information presentation apparatus according to the present invention.

FIG. 13 is a schematic structural diagram of Embodiment 4 of an information presentation apparatus according to the present invention. As shown in FIG. 13, based on the apparatus shown in FIG. 12, an apparatus 1300 in this embodiment may further include: a capturing module 1204.

The capturing module 1204 may be configured to: when the presentation priority of the first information in the current situation is greater than the second preset value, after the first information is presented to the user, capture the reading action information of the user, and update the scene model according to the reading action information.

Figure 14:
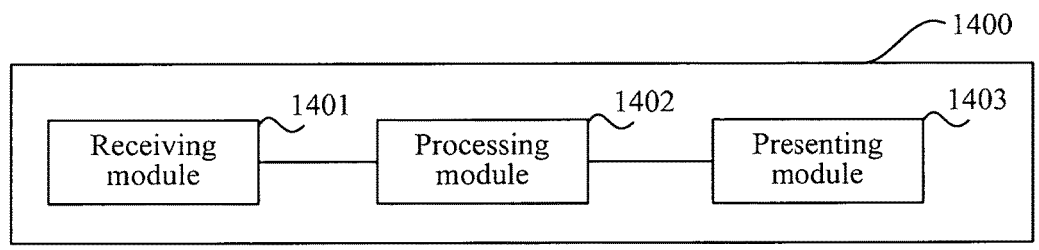
FIG. 14 is a schematic structural diagram of Embodiment 5 of an information presentation apparatus according to the present invention.

FIG. 14 is a schematic structural diagram of Embodiment 5 of an information presentation apparatus according to the present invention. The information presentation apparatus in this embodiment can independently complete a process of information receiving, filtering, and presentation. As shown in FIG. 14, an apparatus 1400 in this embodiment may include: a receiving module 1401, a processing module 1402, and a presenting module 1403.

The receiving module 1401 is configured to receive first information provided by a communications network, where the first information includes any one of the following: text information, image information, audio information, and video information.

The processing module 1402 is configured to determine a presentation priority of the first information in a current situation.

The presenting module 1403 is configured to present the first information to a user when the presentation priority of the first information in the current situation is greater than or equal to a second preset value.

Optionally, the processing module 1402 may be specifically configured to:

acquire scene context information, where the scene context information is used to determine the current situation of the user;

calculate, according to the scene context information, a preset scene matching the current situation, and calculate a correlation between the first information and the preset scene; and determine the presentation priority of the first information in the current situation according to the correlation.

Optionally, the processing module 1402 may be specifically configured to:

after determining the presentation priority of the first information in the current situation, when the presentation priority of the first information in the current situation is less than the second preset value, acquire scene context information again after waiting for a preset period of time;

calculate a similarity between a current situation and each preset scene according to the scene context information; and calculate a presentation priority of the first information according to the similarity and a correlation between the first information and a preset scene.

The apparatus in this embodiment may be configured to execute the technical solution of the method embodiment shown in FIG. 7; and implementation principles thereof are similar, and are not repeatedly described herein.

In this embodiment, after receiving first information provided by a communications network, a presentation priority of the first information in a current situation is determined, and the first information is presented to a user. That is, it can be implemented that only important and urgent information or information strongly related to the current situation of the user is pushed or presented according to the current situation of the user. Therefore, interference of information unrelated to the current situation with the user can be reduced.

Moreover, because the presented information is needed by the user, a possibility of carefully reading the information by the user can be increased, and a presentation effect can be improved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. An information presentation method comprising:
receiving, by a mobile terminal communicatively coupled to a wearable device, a first information piece provided by a communications network, wherein the first information piece comprises any one of the group consisting of: text information, image information, audio information, and video information;
maintaining, by the mobile terminal, a scene model, wherein the scene model is used to determine a correlation between the first information piece and a preset scene, and the scene model comprises: a basic scene feature, an information category feature, and a keyword feature, and wherein the scene model is further based upon a historical information of information pieces presented on the wearable device, wherein the historical information comprises a reading action score assigned to individual ones of the information pieces based upon a user reading action response to presenting the information piece on the wearable device, and wherein the reading action score is provided according to a mapping relationship between a user reading action and an evaluation score, and wherein a group of user reading actions represented in the mapping relationship comprises:
the user sets the information as junk information;
the user does not click or read the information;
the user reads the information for a time period less than a first threshold;
the user reads the information for a time period greater than a second threshold; and
the user reads the information for a time period exceeding the second threshold and forwards the information;
determining, by the mobile terminal, a presentation priority of the first information piece in a current situation of a user based upon the scene model;
sending the first information piece to a wearable device when the presentation priority of the first information piece in the current situation is greater than or equal to a second preset value, so that the wearable device presents the first information piece to the user;
receiving, by the mobile terminal, the reading action information sent by the wearable device; and
updating the scene model according to the reading action information.

2. The method according to claim 1, wherein the determining, by the mobile terminal, a presentation priority of the first information piece in a current situation comprises:
acquiring, by the mobile terminal, scene context information of the wearable device from the wearable device, wherein the scene context information is used to determine the current situation of the user;
calculating, by the mobile terminal according to the scene context information, a preset scene matching the current situation, and calculating a correlation between the first information piece and the preset scene; and
determining, by the mobile terminal, the presentation priority of the first information piece in the current situation according to the correlation.

3. The method according to claim 1, after the calculating, by the mobile terminal, a presentation priority of the first information piece in a current situation, further comprising:
when the presentation priority of the first information piece in the current situation is less than the second preset value, acquiring scene context information of the wearable device from the wearable device again after waiting for a preset period of time, wherein the scene context information is used to determine a current situation of the user;
calculating, by the mobile terminal according to the scene context information, a preset scene matching the current situation, and calculating a correlation between the first information piece and the preset scene; and
determining, by the mobile terminal, a presentation priority of the first information piece in the current situation according to the correlation.

4. The method according to claim 1, wherein the determining, by the mobile terminal, a correlation between the first information piece and the preset scene comprises:
parsing, by the mobile terminal, a feature of the first information piece, and calculating the correlation between the first information piece and the preset scene according to the scene model.

5. The method according to claim 1, wherein the establishing, by the mobile terminal, a scene model comprises:
establishing, by the mobile terminal, the scene model according to a browsing history record of the first information piece, wherein the browsing history record of the first information piece comprises: a record time, a basic scene feature when the first information piece is received, an information category feature of the first information piece, a keyword feature of the first information piece, wherein browsing history records corresponding to different record times have a same weight or different weights.

6. The method of claim 1, wherein during the updating a new entry is added to a historical information corresponding to the first information piece, and includes a score value assigned to the first information piece based upon applying the mapping relationship to a user reading action on the first information piece.

7. An information presentation method, comprising:
receiving, by a mobile terminal communicatively coupled to a wearable device, a first information piece provided by a communications network, wherein the first information piece comprises any one of the group consisting of: text information, image information, audio information, and video information;

maintaining, by the mobile terminal, a scene model, wherein the scene model is used to determine a correlation between the first information piece and a preset scene, and the scene model comprises: a basic scene feature, an information category feature, and a keyword feature, and wherein the scene model is further based upon a historical information of information pieces presented on the wearable device, wherein the historical information comprises a reading action score assigned to individual ones of the information pieces based upon a user reading action response to presenting the information piece on the wearable device, and wherein the reading action score is provided according to a mapping relationship between a user reading action and an evaluation score, and wherein a group of user reading actions represented in the mapping relationship comprises:

the user sets the information as junk information;
the user does not click or read the information;
the user reads the information for a time period less than a first threshold;
the user reads the information for a time period greater than a second threshold; and
the user reads the information for a time period exceeding the second threshold and forwards the information;

determining, by the mobile terminal, a correlation between the first information piece and at least one preset scene;
determining, by the mobile terminal, a presentation priority of the first information piece in a current situation of a user based upon the scene model and when the correlation between the first information piece and at least one of the preset scenes is greater than or equal to a first preset value;
sending the first information piece to a wearable device when the presentation priority of the first information piece in the current situation is greater than or equal to a second preset value, so that the wearable device presents the first information piece to the user;
receiving, by the mobile terminal, the reading action information sent by the wearable device; and
updating the scene model according to the reading action information.

8. The method according to claim 7, after the determining, by the mobile terminal, a correlation between the first information piece and at least one preset scene, further comprising:
using, by the mobile terminal, the first information piece as junk information when the correlation between the first information piece and each preset scene is less than the first preset value.

9. The method according to claim 7, wherein the determining, by the mobile terminal, a presentation priority of the first information piece in a current situation comprises:
acquiring, by the mobile terminal, scene context information of the wearable device from the wearable device, wherein the scene context information is used to determine the current situation of the user;
calculating, by the mobile terminal, a similarity between the current situation and each preset scene according to the scene context information; and
calculating, by the mobile terminal, the presentation priority of the first information piece according to the similarity and the correlation between the first information piece and the preset scene.

10. The method according to claim 7, after the calculating, by the mobile terminal, a presentation priority of the first information piece in a current situation, further comprising:
when the presentation priority of the first information piece in the current situation is less than the second preset value, acquiring scene context information of the wearable device from the wearable device again after waiting for a preset period of time, wherein the scene context information is used to determine a current situation of the user;
calculating, by the mobile terminal according to the scene context information, a preset scene matching the current situation, and calculating a correlation between the first information piece and the preset scene; and
determining, by the mobile terminal, a presentation priority of the first information piece in the current situation according to the correlation.

11. The method according to claim 7, wherein the determining, by the mobile terminal, a correlation between the first information piece and at least one preset scene comprises:
parsing, by the mobile terminal, a feature of the first information piece, and calculating the correlation between the first information piece and the at least one preset scene according to the scene model.

12. The method according to claim 7, wherein the establishing, by the mobile terminal, a scene model comprises:
establishing, by the mobile terminal, the scene model according to a browsing history record of the first information piece, wherein the browsing history record of the first information piece comprises: a record time, a basic scene feature when the first information piece is received, an information category feature of the first information piece, a keyword feature of the first information piece, wherein browsing history records corresponding to different record times have a same weight or different weights.

13. The method of claim 7, wherein during the updating a new entry is added to a historical information corresponding to the first information piece, and includes a score value assigned to the first information piece based upon applying the mapping relationship to a user reading action on the first information piece.

14. An information presentation method, comprising:
receiving, by a wearable device communicatively coupled to a mobile terminal, a first information piece, wherein the first information piece is sent by the mobile terminal after the mobile terminal determines that a presentation priority in a current situation is greater than a second preset value, and the first information piece comprises any one of the group consisting of: text information, image information, audio information, and video information;
maintaining, by the mobile terminal, a scene model, wherein the scene model is used to determine a correlation between the first information piece and a preset scene, and the scene model comprises: a basic scene feature, an information category feature, and a keyword feature, and wherein the scene model is further based upon a historical information of information pieces presented on the wearable device, wherein the historical information comprises a reading action score assigned to individual ones of the information pieces based upon a user reading action response to presenting the information piece on the wearable device, and wherein the reading action score is provided according to a mapping relationship between a user reading action and an evaluation score, and wherein a group of user reading actions represented in the mapping relationship comprises:
  the user sets the information as junk information;
  the user does not click or read the information;
  the user reads the information for a time period less than a first threshold;
  the user reads the information for a time period greater than a second threshold; and
  the user reads the information for a time period exceeding the second threshold and forwards the information;
determining, by the mobile terminal, a presentation priority of the first information piece in a current situation of a user based upon the scene model;
sending the first information piece to a wearable device when the presentation priority of the first information piece in the current situation is greater than or equal to a second preset value, so that the wearable device presents the first information piece to the user;
presenting, by the wearable device, the first information piece to a user;
receiving, by the mobile terminal, the reading action information sent by the wearable device; and
updating the scene model according to the reading action information.

15. The method according to claim 14, after the presenting, by the wearable device, the first information piece to a user, further comprising:
  capturing, by the wearable device, reading action information, wherein the reading action information at least comprises: whether the first information piece is deleted, whether the first information piece is read, duration of reading the first information piece, and whether the first information piece is forwarded; and
  sending, by the wearable device, the reading action information to the mobile terminal, so that the mobile terminal updates the scene model according to the reading action information.

16. The method according to claim 14, further comprising:
  receiving, by the wearable device, a scene context information request sent by the mobile terminal; and
  sending, by the wearable device, scene context information to the mobile terminal.

17. The method according to claim 14, wherein the presenting, by the wearable device, the first information piece to a user comprises:
  sending out, by the wearable device, prompt information.

18. The method of claim 14, wherein during the updating a new entry is added to a historical information corresponding to the first information piece, and includes a score value assigned to the first information piece based upon applying the mapping relationship to a user reading action on the first information piece.

* * * * *